United States Patent
Choi et al.

(10) Patent No.: US 11,642,662 B2
(45) Date of Patent: May 9, 2023

(54) PHOTOCATALYST COMPRISING BIMETALLIC NANOPARTICLES AND GRAPHENE OXIDE FOR DENITRIFICATION REACTION, AND WATER TREATMENT METHOD USING SAME

(71) Applicant: POSTECH Research and Business Development Foundation, Pohang-si (KR)

(72) Inventors: Wonyong Choi, Pohang-si (KR); Shinbi Lee, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 121 days.

(21) Appl. No.: 17/228,874

(22) Filed: Apr. 13, 2021

(65) Prior Publication Data
US 2022/0258139 A1    Aug. 18, 2022

(30) Foreign Application Priority Data
Feb. 15, 2021    (KR) .................. 10-2021-0019981

(51) Int. Cl.
*B01J 23/89*    (2006.01)
*C01B 32/198*    (2017.01)
(Continued)

(52) U.S. Cl.
CPC ......... *B01J 23/8926* (2013.01); *B01J 21/063* (2013.01); *B01J 21/185* (2013.01); *B01J 35/004* (2013.01); *B01J 35/0006* (2013.01); *B01J 35/023* (2013.01); *B01J 37/038* (2013.01); *B01J 37/04* (2013.01); *B01J 37/06* (2013.01); *B01J 37/345* (2013.01); *C01B 21/0422* (2013.01); *C01B 32/192* (2017.08); *C01B 32/198* (2017.08); *C02F 1/32* (2013.01); *C02F 1/725* (2013.01); *C01B 2204/02* (2013.01); *C01P 2004/04* (2013.01); *C02F 2101/163* (2013.01);
(Continued)

(58) Field of Classification Search
None
See application file for complete search history.

(56) References Cited

PUBLICATIONS

Silva et al., "Catalytic and Photocatalytic Nitrate Reduction Over Pd-Cu loaded over Hybrid Materials of Multi-Walled Carbon Nanotubes and Ti02", Frontiers in Chemistry, 2018, pp. 1-10. (Year: 2018).*

(Continued)

*Primary Examiner* — Philip Y Louie
(74) *Attorney, Agent, or Firm* — Lex IP Meister, PLLC

(57) ABSTRACT

Proposed are a photocatalyst, including titanium dioxide particles including titanium dioxide ($TiO_2$), a carbon material located on all or part of the surface of the titanium dioxide particles and including at least one selected from the group consisting of graphene, reduced graphene oxide (rGO), and carbon nanotubes (CNTs), and bimetallic nanoparticles supported on the carbon material and including first metal nanoparticles and second metal nanoparticles, and a water treatment method using the same. In the photocatalyst and the water treatment method using the same, the photocatalyst including bimetallic nanoparticles and graphene oxide is prepared, thereby exhibiting high reduction efficiency and high selectivity to nitrogen gas even without the use of an external electron donor.

18 Claims, 21 Drawing Sheets

(51) Int. Cl.
  *B01J 21/06* (2006.01)
  *B01J 37/34* (2006.01)
  *C02F 1/32* (2023.01)
  *C01B 32/192* (2017.01)
  *B01J 37/06* (2006.01)
  *B01J 37/04* (2006.01)
  *B01J 37/03* (2006.01)
  *B01J 21/18* (2006.01)
  *C01B 21/04* (2006.01)
  *B01J 35/00* (2006.01)
  *B01J 35/02* (2006.01)
  *C02F 1/72* (2023.01)
  *C02F 101/16* (2006.01)

(52) U.S. Cl.
  CPC ...... *C02F 2305/08* (2013.01); *C02F 2305/10* (2013.01)

(56) References Cited

PUBLICATIONS

Schmal et al., "Synthesis of Reduced Graphene Oxide as a Support for Nano Copper and Palladium/Copper Catalysts for Selective No. Reduction by Co", Acs Omega, 2020, 5, p. 25568-25581. (Year: 2020).*

Gao et al., "Catalytic reduction of nitrite ions in drinking water over Pd-Cu/Ti02 bimetallic catalyst", Catalysis Today, vols. 93-95, 2004, pp. 33-339 (Year: 2004).*

KIPO, Office Action of KR 10-2021-0019981 dated Jul. 5, 2022.

Bijoy Tudu et al., "Electronic Integration and Thin Film Aspects of Au-Pd/rGO/TiO2 for Improved Solar Hydrogen Generation", ACS Appl. Mater. Interfaces 2019, 11, 32869-32878, Aug. 15, 2019.

Najah Wehbe et al., "Comparative study of photocatalytic and non-photocatalytic reduction of nitrates in water", Applied Catalysis A General 368 (2009) 1-8, Aug. 3, 2009.

Sukhman Sandhu et al., "Photocatalytic denitrification of water using polystyrene immobilized TiO2 as floating catalyst", Journal of Environmental Chemical Engineering 8 (2020) 104471, Sep. 12, 2020.

Fenghe Lv et al., "Fabrication and photocatalytic ability of an Au/TiO2/reduced graphene oxide nanocomposite", Front. Environ. Sci. Eng. 2018, 12(1): 4, Jul. 28, 2017.

* cited by examiner

PHOTOCATALYST COMPRISING BIMETALLIC NANOPARTICLES AND GRAPHENE OXIDE FOR DENITRIFICATION REACTION, AND WATER TREATMENT METHOD USING SAME

CROSS REFERENCE TO RELATED APPLICATION

The present application claims priority based on Korean Patent Application No. 10-2021-0019981, filed on Feb. 15, 2021, the entire content of which is incorporated herein for all purposes by this reference.

BACKGROUND OF THE DISCLOSURE

1. Technical Field

The present disclosure relates to a photocatalyst for a denitrification reaction and a water treatment method using the same, and more particularly to a photocatalyst exhibiting high reaction efficiency and high selectivity even without the use of an external electron donor by preparing the photocatalyst including bimetallic nanoparticles and graphene oxide, and a water treatment method using the same.

2. Description of the Related Art

The nitrogen cycle in nature is maintained by repeating nitrogen fixation, which converts $N_2$ in ambient air for use by living things, and denitrification, which is the opposite process. As a result of development of technology for fixing a large amount of nitrogen (Haber-Bosch process) to solve the energy/food shortage problem caused by population growth, the additional nitrogen fixation reaches 100 million tons every year, breaking the balance of the nitrogen cycle in nature and causing a variety of environmental problems due to the accumulation of large amounts of nitrogen compounds in the environment. Therefore, in the field of water quality and air pollution control technology, denitrification technology is regarded as a key technique to prevent environmental pollution.

Reduction from nitrate ions ($NO_3^-$) into nitrite ions ($NO_2^-$) is known to be a rate-determining reaction during denitrification. Nitrite ions, which are known to be the major intermediate produced during denitrification, are a toxic substance, the concentration of which in water is regulated to less than 1 ppm.

In previously reported denitrification reaction using a photocatalyst material containing bimetal supported thereon, the reaction efficiency (the extent to which nitrate ions are reduced) is fundamentally dependent on the presence or absence of an electron donor (e.g. $H_2$, methanol, or formic acid). Even when excess electron donor is used, not only nitrogen gas but also nitrite ions and ammonium ions ($NH^+$) are obtained as final products, and the selectivity thereto is remarkably low. Moreover, the use of an electron donor causes significant disadvantages such as an increase in maintenance costs related to the catalytic process and the generation of secondary pollutants due to decomposition of the electron donor. Therefore, although there are many advantages of the photocatalyst material, it is difficult to establish a photocatalyst-based process for removing nitrogen oxide on a large scale.

SUMMARY OF THE DISCLOSURE

Accordingly, an objective of the present disclosure is to provide a denitrification photocatalyst exhibiting high reaction efficiency and high selectivity, which is capable of almost completely eliminating the production of byproducts, even without an electron donor, and of converting nitrate ($NO_3^-$) into dinitrogen ($N_2$), by preparing the photocatalyst including bimetallic nanoparticles (Cu—Pd) and graphene oxide (rGO), and a water treatment method using the same.

Another objective of the present disclosure is to provide a photocatalyst that enables a complete water decomposition reaction due to the effective separation of electrons and holes by preparing the photocatalyst for a denitrification reaction, and is also capable of reducing $NO_2^-$, which is an intermediate, into $N_2$ by suppressing the reoxidation reaction into $NO_3^-$, and a water treatment method using the same.

Still another objective of the present disclosure is to provide a photocatalyst that is useful in environmental water treatment technology for removing toxic inorganic substances from water and is applicable as a material capable of increasing the reduction efficiency of a hydrogen-mediated reduction reaction, and a water treatment method using the same.

An aspect of the present disclosure provides a photocatalyst, including: titanium dioxide particles including titanium dioxide ($TiO_2$); a carbon material located on all or part of the surface of the titanium dioxide particles and including at least one selected from the group consisting of graphene, reduced graphene oxide (rGO), and carbon nanotubes (CNTs); and bimetallic nanoparticles supported on the carbon material and including first metal nanoparticles and second metal nanoparticles.

The first metal nanoparticles may include any one selected from the group consisting of copper (Cu), silver (Ag), indium (In), and nickel (Ni), and the second metal nanoparticles may include any one selected from the group consisting of palladium (Pd) and platinum (Pt).

The photocatalyst may be a denitrification catalyst for removing nitrate ions ($NO_3^-$).

A denitrification reaction may be carried out without the addition of an electron donor using the photocatalyst.

Nitrogen gas ($N_2$) may be produced as a final product through the denitrification reaction using the photocatalyst.

The carbon material may be reduced graphene oxide (rGO).

The average size of the first metal nanoparticles may be 1 to 5 nm, and the average size of the second metal nanoparticles may be 1 to 5 nm.

The bimetallic nanoparticles may include the first metal nanoparticles (M1) and the second metal nanoparticles (M2) at a mass ratio (M1:M2) of 3:7 to 7:3.

The bimetallic nanoparticles may include the first metal nanoparticles (M1) and the second metal nanoparticles (M2) at a mass ratio (M1:M2) of 4:6 to 6:4.

The photocatalyst may include 100 parts by weight of the titanium dioxide ($TiO_2$) particles, 0.1 to 5 parts by weight of the carbon material, and 0.2 to 10 parts by weight of the bimetallic nanoparticles.

Another aspect of the present disclosure provides a water treatment method including carrying out a denitrification reaction for reducing nitrate ions ($NO_3^-$) into nitrogen gas ($N_2$) by decomposing water using the photocatalyst described above as a catalyst under light irradiation.

The denitrification reaction may be carried out at a pH of 3 to 10.

The light irradiation may be performed using light including ultraviolet rays or visible light rays.

The light irradiation may be performed using light having a wavelength of 270 to 450 nm.

The denitrification reaction may be carried out without the use of an external electron donor.

Still another aspect of the present disclosure provides a method of preparing a photocatalyst, including: (a) preparing a first mixed solution including titanium dioxide ($TiO_2$) particles and at least one carbon material selected from the group consisting of graphene, reduced graphene oxide (rGO), and carbon nanotubes (CNTs); (b) preparing a composite including the titanium dioxide particles and the carbon material located on all or part of the surface of the titanium dioxide particles by stirring and drying the first mixed solution; (c) preparing a second mixed solution including the composite, a first metal nanoparticle precursor, and a second metal nanoparticle precursor; and (d) preparing a photocatalyst including first metal nanoparticles and second metal nanoparticles supported on the carbon material of the composite by irradiating the second mixed solution with light.

The carbon material may be reduced graphene oxide, and the method may further include (a') preparing the reduced graphene oxide by reducing graphene oxide, before step (a).

In step (c), the first metal nanoparticle precursor may include at least one selected from the group consisting of copper (II) chloride ($CuCl_2$), copper (II) acetate (Cu ($CH_3COO)_2$), and copper (II) nitrate ($Cu(NO_3)_2$).

In step (c), the second metal nanoparticle precursor may include at least one selected from the group consisting of palladium (II) chloride ($PdCl_2$), palladium (II) acetate (Pd ($CH_3COO)_2$), and palladium (II) nitrate ($Pd(NO_3)_2$).

Step (d) may be performed through photodeposition.

According to the present disclosure, there are provided a photocatalyst for a denitrification reaction and a water treatment method using the same, in which the photocatalyst including bimetallic nanoparticles (Cu—Pd) and graphene oxide (rGO) can be prepared, whereby production of byproducts can be almost completely prevented without the addition of an external electron donor, nitrate ($NO_3^-$) can be converted into dinitrogen ($N_2$), and high reaction efficiency and high selectivity can be exhibited.

Also, according to the present disclosure, the photocatalyst for a denitrification reaction can be prepared, thus enabling a complete water decomposition reaction due to the effective separation of electrons and holes and suppressing the reoxidation reaction from $NO_2^-$, which is an intermediate, into $NO_3^-$, thereby realizing reduction into $N_2$.

Also, according to the present disclosure, the photocatalyst is useful in environmental water treatment technology for removing toxic inorganic substances from water and is also applicable as a material capable of increasing the reduction efficiency of hydrogen-mediated reduction reactions.

DESCRIPTION OF SPECIFIC EMBODIMENTS

Figure 1A:
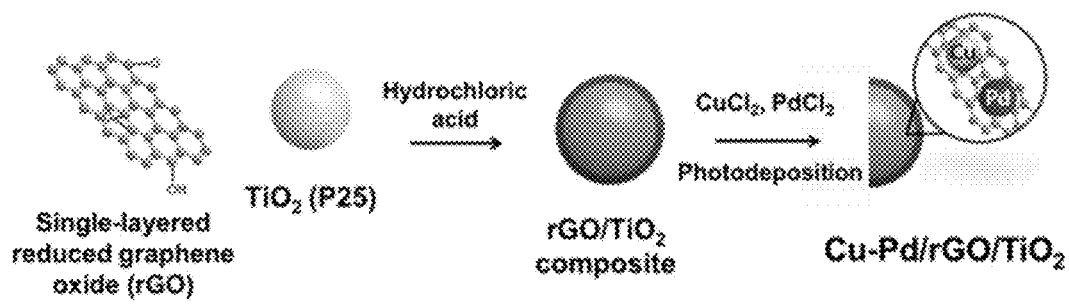
FIG. 1A schematically shows a process of preparing a photocatalyst according to the present disclosure, and FIG. 1B schematically shows the movement paths of photoelectrons and holes generated by light in the presence of the photocatalyst according to Example 1 and Comparative Examples 4 and 5.

Hereinafter, exemplary embodiments of the present disclosure are described in detail with reference to the appended drawings so as to be easily performed by a person having ordinary skill in the art.

However, the following description does not limit the present disclosure to specific embodiments, and in the description of the present disclosure, detailed descriptions of related known techniques incorporated herein will be omitted when the same may make the gist of the present disclosure unclear.

The terms herein are used to explain specific embodiments, and are not intended to limit the present disclosure. Unless otherwise stated, a singular expression includes a plural expression. In the present application, the teams "comprise", "include" or "have" are used to designate the presence of features, numbers, steps, operations, elements, or combinations thereof described in the specification, and should be understood as not excluding the presence or additional possible presence of one or more different features, numbers, steps, operations, elements, or combinations thereof.

As used herein, the terms "first", "second", etc. may be used to describe various elements, but these elements are not to be limited by these terms. These terms are only used to distinguish one element from another. For example, a first element may be teamed a second element, and similarly, a second element may be termed a first element, without departing from the scope of the present disclosure.

Further, it will be understood that when an element is referred to as being "formed" or "stacked" on another element, it can be formed or stacked so as to be directly attached to all surfaces or to one surface of the other element, or intervening elements may be present therebetween.

Hereinafter, a detailed description will be given of a photocatalyst according to the present disclosure, which is set forth to illustrate, but is not to be construed as limiting, the present disclosure, and the present disclosure is defined only by the accompanying claims.

The present disclosure pertains to a photocatalyst, including titanium dioxide particles including titanium dioxide ($TiO_2$), a carbon material located on all or part of the surface of the titanium dioxide particles and including at least one selected from the group consisting of graphene, reduced graphene oxide (rGO), and carbon nanotubes (CNTs), and bimetallic nanoparticles supported on the carbon material and including first metal nanoparticles and second metal nanoparticles.

The first metal nanoparticles may include any one selected from the group consisting of copper (Cu), silver (Ag), indium (In), and nickel (Ni), and the second metal nanoparticles may include any one selected from the group consisting of palladium (Pd) and platinum (Pt), and preferably, the first metal nanoparticles include copper (Cu), and the second metal nanoparticles include palladium (Pd).

The photocatalyst may be a denitrification catalyst for removing nitrate ions ($NO_3^-$).

A denitrification reaction may be carried out without the addition of an electron donor using the photocatalyst.

Nitrogen gas ($N_2$) may be produced as a final product through the denitrification reaction using the photocatalyst.

The carbon material may be reduced graphene oxide (rGO).

The average size of the first metal nanoparticles may be 1 to 5 nm, and the average size of the second metal nanoparticles may be 1 to 5 nm.

The bimetallic nanoparticles may include the first metal nanoparticles (M1) and the second metal nanoparticles (M2) at a mass ratio (M1:M2) of 3:7 to 7:3, preferably 4:6 to 6:4, and more preferably 5:5.

If the mass ratio of the first metal nanoparticles (M1) to the second metal nanoparticles (M2) (M1:M2) is less than 3:7, the $NO_3^-$ conversion efficiency may decrease, which is undesirable. On the other hand, if the mass ratio thereof exceeds 7:3, the selectivity to $N_2$ may decrease, which is undesirable.

The copper (Cu) nanoparticles, serving as a promoter cocatalyst, allow the high activation energy to be overcome, and the palladium (Pd) nanoparticles, serving as a hydrogenation catalyst, are able to generate a greater amount of hydrogen to thereby quickly reduce the intermediate $NO_2^-$ into $N_2$. In addition, the reduced graphene oxide (rGO) serves as a charge transfer mediator, so the generated charge may quickly move to the bimetal through rGO. Thereby, a complete water decomposition reaction becomes possible due to the effective separation of electrons and holes, and the reoxidation reaction from the intermediate $NO_2^-$ into $NO_3^-$ is suppressed, thus enabling reduction into $N_2$, which is thermodynamically unfavorable, without an electron donor.

The photocatalyst may include 100 parts by weight of the titanium dioxide ($TiO_2$) particles, 0.1 to 5 parts by weight of the carbon material, and 0.2 to 10 parts by weight of the bimetallic nanoparticles.

The photocatalyst may include the titanium dioxide ($TiO_2$) particles in an amount of 95 to 99 wt %, preferably 96 to 98 wt %, and more preferably 97 wt %, the carbon material in an amount of 0.1 to 2 wt %, preferably 0.5 to 1.5 wt %, and more preferably 1 wt %, the first metal nanoparticles in an amount of 0.1 to 2 wt %, preferably 0.5 to 1.5 wt %, and more preferably 1 wt %, and the second metal nanoparticles in an amount of 0.1 to 2 wt %, preferably 0.5 to 1.5 wt %, and more preferably 1 wt %.

Figure 1B:
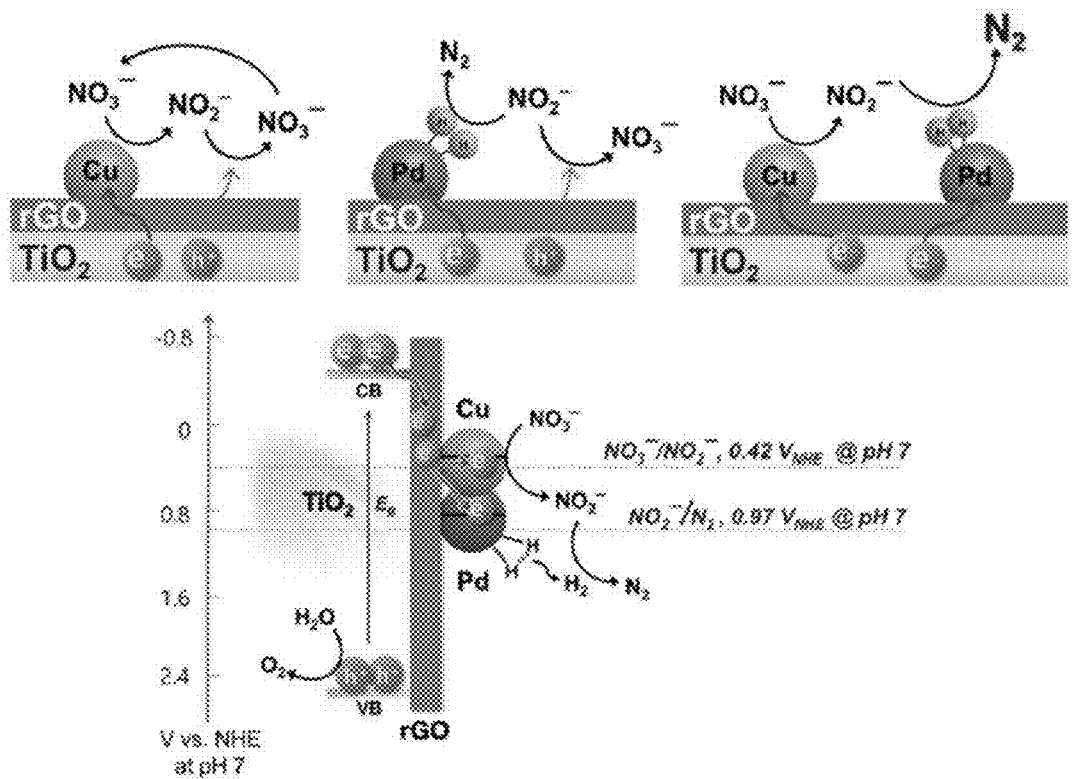

FIG. 1A schematically shows the process of preparing the photocatalyst according to the present disclosure, and FIG. 1B schematically shows the movement paths of photoelectrons and holes generated by light in the presence of the photocatalyst according to the present disclosure.

Hereinafter, a detailed description will be given of a water treatment method using the photocatalyst of the present disclosure and a method of preparing the photocatalyst with reference to FIGS. 1A and 1B.

The present disclosure pertains to a water treatment method including carrying out a denitrification reaction for reducing nitrate ions ($NO_3^-$) into nitrogen gas ($N_2$) by decomposing water using the photocatalyst described above as a catalyst under light irradiation.

The water includes a toxic substance, and the toxic substance may include at least one selected from the group consisting of nitrate ions ($NO_3^-$), nitrite ions ($NO_2^-$), and cyanides ($CN^-$).

The denitrification reaction may be carried out at a pH of 3 to 10.

The light irradiation may be performed using light including ultraviolet rays or visible light rays.

The light irradiation may be performed using light having a wavelength of 270 to 450 nm.

The denitrification reaction may be carried out without the use of an external electron donor.

Below is a description of the method of preparing the photocatalyst.

Specifically, a first mixed solution including titanium dioxide ($TiO_2$) particles and at least one carbon material selected from the group consisting of graphene, reduced graphene oxide (rGO), and carbon nanotubes (CNTs) is prepared (step a).

The carbon material may be reduced graphene oxide, and (a') preparing the reduced graphene oxide by reducing graphene oxide may be further performed before step (a).

The first mixed solution may further include an acid.

The acid may include at least one selected from the group consisting of hydrochloric acid (HCl), nitric acid ($HNO_3$), acetic acid ($CH_3COOH$), phosphoric acid ($H_3PO_4$), and sulfuric acid ($H_2SO_4$), and preferably includes hydrochloric acid.

Next, the first mixed solution is stirred and dried, thus preparing a composite including the titanium dioxide particles and the carbon material located on all or part of the surface of the titanium dioxide particles (step b).

In step (b), the stirring may be performed through ultrasonication.

After step (b), (b') heat-treating the composite may be further performed.

In step (b'), the heat-treating may be performed at a temperature of 100 to 300° C.

Next, a second mixed solution including the composite, a first metal nanoparticle precursor and a second metal nanoparticle precursor is prepared (step c).

In step (c), the first metal nanoparticle precursor may include at least one selected from the group consisting of copper (II) chloride ($CuCl_2$), copper (II) acetate (Cu($CH_3COO)_2$), and copper (II) nitrate ($Cu(NO_3)_2$).

In step (c), the second metal nanoparticle precursor may include at least one selected from the group consisting of palladium (II) chloride ($PdCl_2$), palladium (II) acetate (Pd($CH_3COO)_2$), and palladium (II) nitrate ($Pd(NO_3)_2$).

Finally, the second mixed solution is irradiated with light, thus preparing a photocatalyst including first metal nanoparticles and second metal nanoparticles supported on the carbon material of the composite (step d).

Step (d) may be performed through photodeposition.

In step (d), light irradiation may be performed for 0.5 to 3 hours.

EXAMPLES

A better understanding of the present disclosure may be obtained through the following examples. However, these examples are merely set forth to illustrate the present disclosure, and are not to be construed as limiting the scope of the present disclosure.

Preparation Example 1 rGO/$TiO_2$

Graphite oxide was prepared by oxidizing natural graphite (SP-1 grade 200 mesh, Bay Carbon Inc.) using the Modified Hummers method, and the graphite oxide was subjected to ultrasonication in water (200 mL) for 1 hour (JAC 4020, 400 W, Sonic), thus exfoliating single-layered graphene oxide (GO).

A dispersion solution for reducing GO, the pH of which was increased by adding 400 μL of an ammonia solution (Samchun Chemicals, 28-30%) and 10 μL of hydrazine hydrate (Aldrich) per mg of graphene oxide (GO), was prepared. The dispersion solution was heated to 95° C. using a reflux condenser and stirred for 2 hours using a glass-encased magnetic stirring bar in order to prevent aggregation of the reduced graphene oxide (rGO) alone, after which the stirred dispersion solution was cooled to room temperature and then added with a $TiO_2$ powder (P25). Here, 4-10 mL of 1 M hydrochloric acid was rapidly added to the stirred dispersion solution in order to disperse the $TiO_2$ powder, followed by ultrasonication and stirring. Subsequently, the precipitate was washed with water, dried at room temperature, and heat-treated at 200° C. in an argon gas atmosphere, thereby preparing rGO/$TiO_2$.

Example 1

Cu—Pd/rGO/$TiO_2$ Photocatalyst

Cu—Pd/rGO/$TiO_2$ was prepared through photodeposition. Specifically, rGO/$TiO_2$, prepared according to Preparation Example 1, was dispersed in a metal precursor solution including methanol (4%, v/v), $CuCl_2$ (Aldrich), and $PdCl_2$ (Aldrich), followed by UV irradiation for 1 hour using a 300 W mercury lamp, thereby preparing Cu—Pd/rGO/$TiO_2$.

Example 2

Cu—Pd/CNT/$TiO_2$ Photocatalyst

Multiwalled carbon nanotubes (CNTs having a diameter of 9.5 nm and a length of 1.5 μm from Aldrich) were dispersed in 75 mL of nitric acid (65-68%) and ultrasonicated overnight, followed by heat treatment at 75° C. in a thermostatic water bath for 5 hours. After cooling to room temperature, a $TiO_2$ powder (P25) was added thereto. Here, in order to disperse the $TiO_2$ powder, 4-10 mL of 1 M hydrochloric acid was rapidly added thereto, followed by ultrasonication and stirring. Subsequently, the precipitate was washed with water, dried at room temperature, and heat-treated at 200° C. in an argon gas atmosphere, thereby preparing CNT/$TiO_2$.

Thereafter, the CNT/$TiO_2$ was dispersed in a metal precursor solution including methanol (4%, v/v), $CuCl_2$ (Aldrich), and $PdCl_2$ (Aldrich) and irradiated with UV light for 1 hour using a 300 W mercury lamp, thereby preparing Cu—Pd/CNT/$TiO_2$.

Comparative Example 1

$TiO_2$ Photocatalyst

A $TiO_2$ powder (P25) was used.

Comparative Example 2

Cu—Pd/$TiO_2$ Photocatalyst

A $TiO_2$ powder (P25) was dispersed in a metal precursor solution including methanol (4%, v/v), $CuCl_2$ (Aldrich) and PdCl$_2$ (Aldrich) and irradiated with UV light for 1 hour using a 300 W mercury lamp, thereby preparing Cu—Pd/TiO$_2$.

Comparative Example 3 rGO/Cu—Pd/TiO$_2$ Photocatalyst

The Cu—Pd/TiO$_2$ powder prepared according to Comparative Example 2 was added to an rGO solution and allowed to react, after which the precipitate was washed with water, dried at room temperature, and heat-treated at 200° C. in an argon gas atmosphere, thereby preparing rGO/Cu—Pd/TiO$_2$.

Comparative Example 4

Cu/rGO/TiO$_2$ Photocatalyst

Cu/rGO/TiO$_2$ was prepared in the same manner as in Example 1, with the exception that CuCl$_2$ (Aldrich) was used, rather than using CuCl$_2$ (Aldrich) and PdCl$_2$ (Aldrich) together, as in Example 1.

Comparative Example 5

Pd/rGO/TiO$_2$ Photocatalyst

Pd/rGO/TiO$_2$ was prepared in the same manner as in Example 1, with the exception that PdCl$_2$ (Aldrich) was used, rather than using CuCl$_2$ (Aldrich) and PdCl$_2$ (Aldrich) together, as in Example 1.

TEST EXAMPLES

Test Example 1

Analysis of Composition of Photocatalyst

Figure 2A:
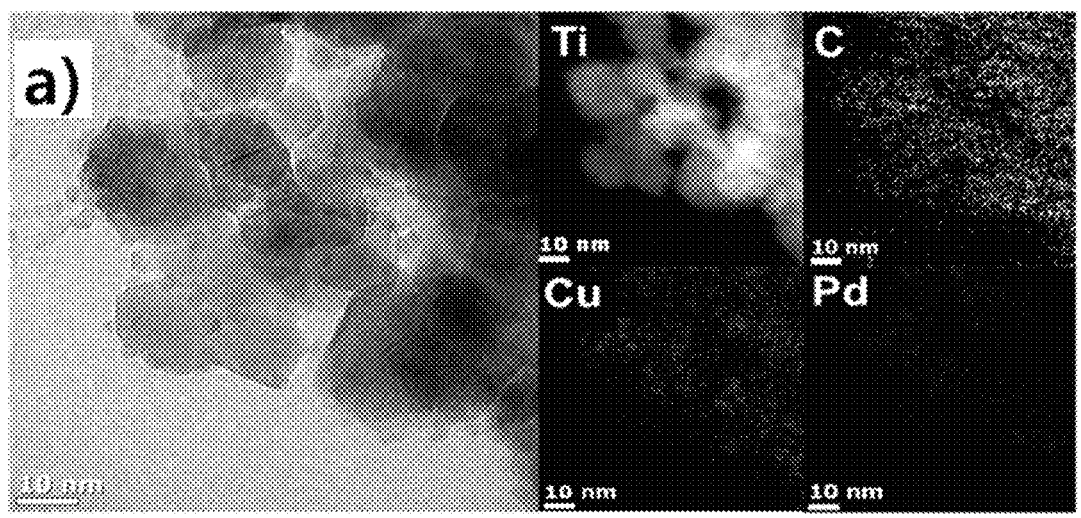
FIG. 2A shows TEM (transmission electron microscopy) images of the photocatalyst according to Example 1.
Figure 2B:
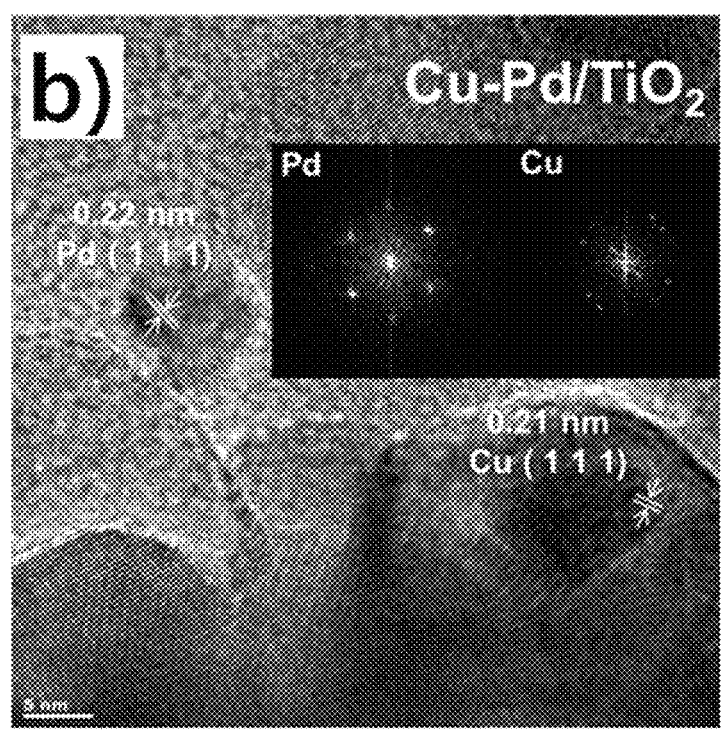
FIGS. 2B and 2C show HRTEM (high-resolution TEM) and FFT (fast Fourier transform) diffraction pattern analysis images of the photocatalysts according to Comparative Example 2 and Example 1.
Figure 2C:
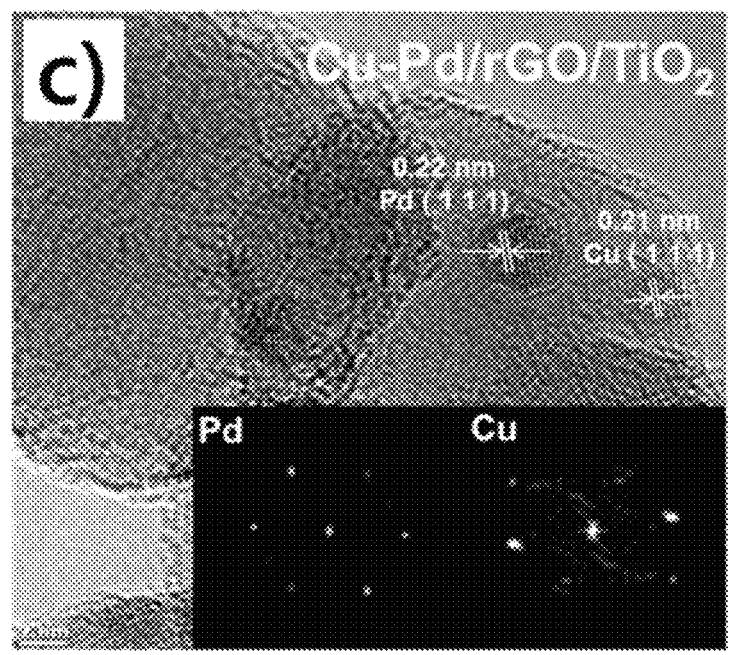
Figure 2D:
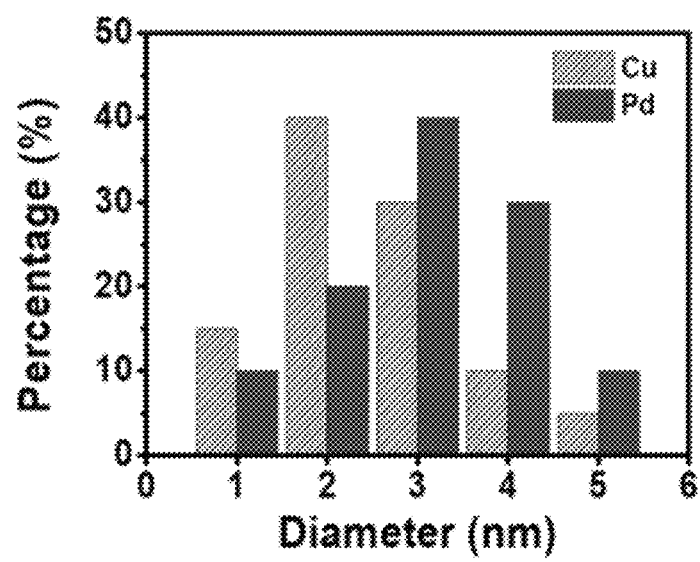
FIG. 2D is a graph showing the size distribution of metal nanoparticles included in the photocatalyst according to Example 1.
Figure 2E:
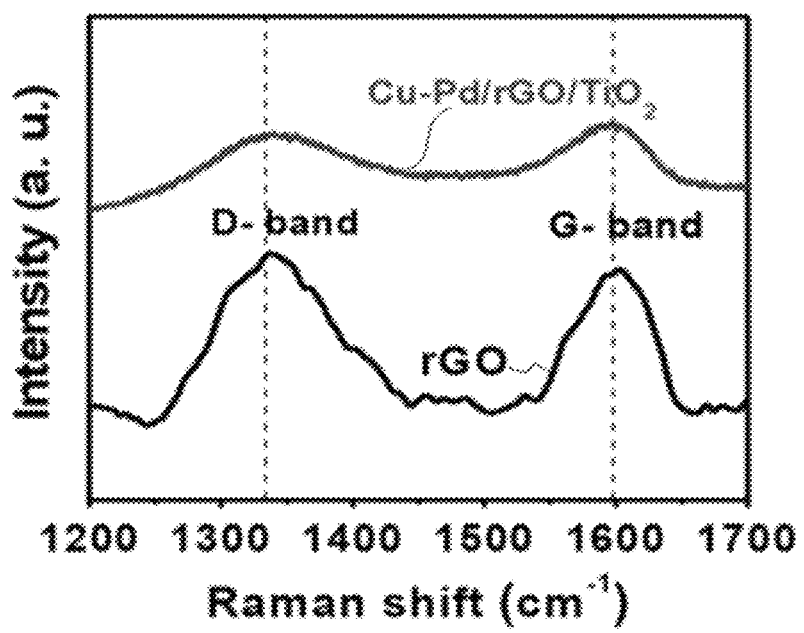
FIG. 2E shows the Raman spectra of the photocatalyst according to Example 1.

FIG. 2A shows TEM images of the photocatalyst according to Example 1, FIGS. 2B and 2C show HRTEM (high-resolution TEM) and FFT (fast Fourier transform) diffraction pattern analysis images of the photocatalysts according to Comparative Example 2 and Example 1, FIG. 2D is a graph showing the size distribution of metal nanoparticles included in the photocatalyst according to Example 1, and FIG. 2E shows the Raman spectra of the photocatalyst according to Example 1.

With reference to FIG. 2A, it was confirmed that each element was evenly distributed on TiO$_2$ through the element mapping of Ti, C, Cu, and Pd.

With reference to FIGS. 2B and 2C, it was confirmed that both Cu and Pd nanoparticles had the (111) facet on TiO$_2$ or rGO/TiO$_2$. Also, the facets of the two metals were the same on TiO$_2$ or rGO/TiO$_2$, from which the catalytic effect of the two metals (Cu and Pd) can be estimated to act equally.

With reference to FIG. 2D, the average sizes of metal nanoparticles Cu and Pd were 2.5 nm and 3.4 nm, respectively.

With reference to FIG. 2E, the peaks of the characteristic D band (peak at 1355 cm$^{-1}$) and G band (peak at 1600 cm$^{-1}$) of rGO were observed, indicating that rGO was contained in Cu—Pd/rGO/TiO$_2$.

Test Example 2

Analysis of Bimetallic Nanoparticles

Figure 3A:
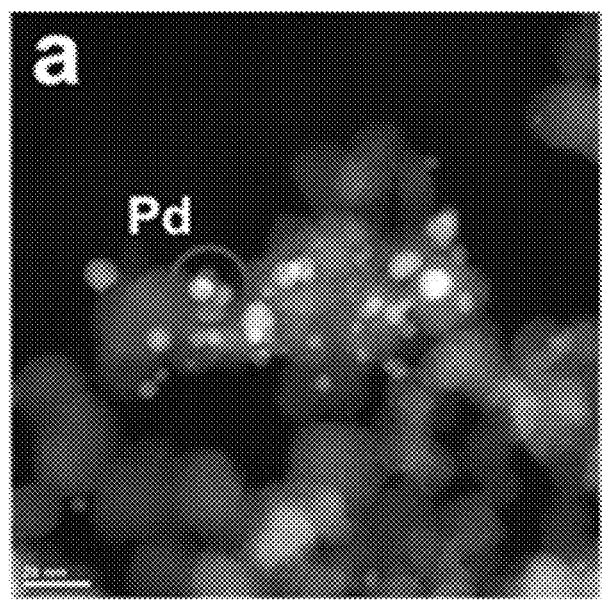
FIG. 3A shows a HAADF-STEM (high-angle dark-field scanning transmission electron microscopy) image of Pd metal nanoparticles included in the photocatalyst according to Example 1.
Figure 3B:
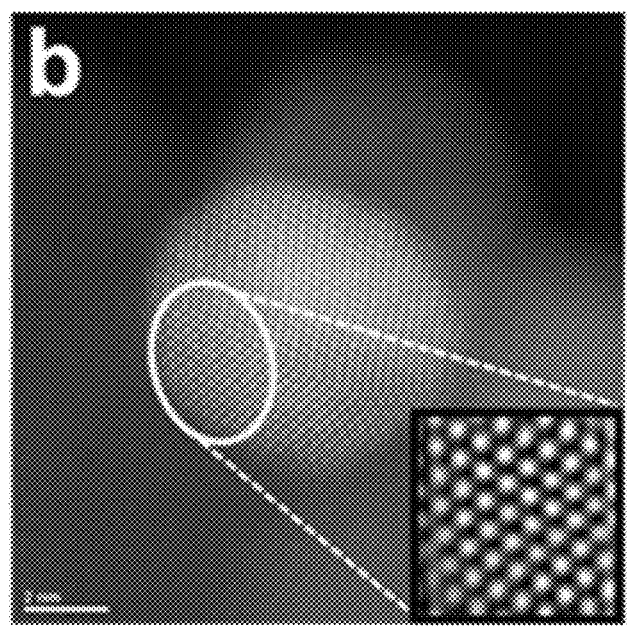
FIG. 3B shows an enlarged image of Pd metal nanoparticles represented by the circle in FIG. 3A.
Figure 3C:
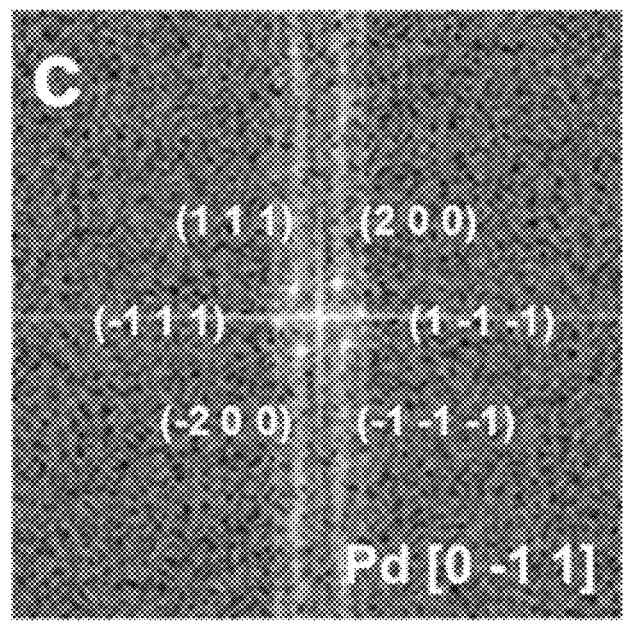
FIG. 3C shows an FFT (fast Fourier transform) diffraction pattern analysis image.
Figure 3D:
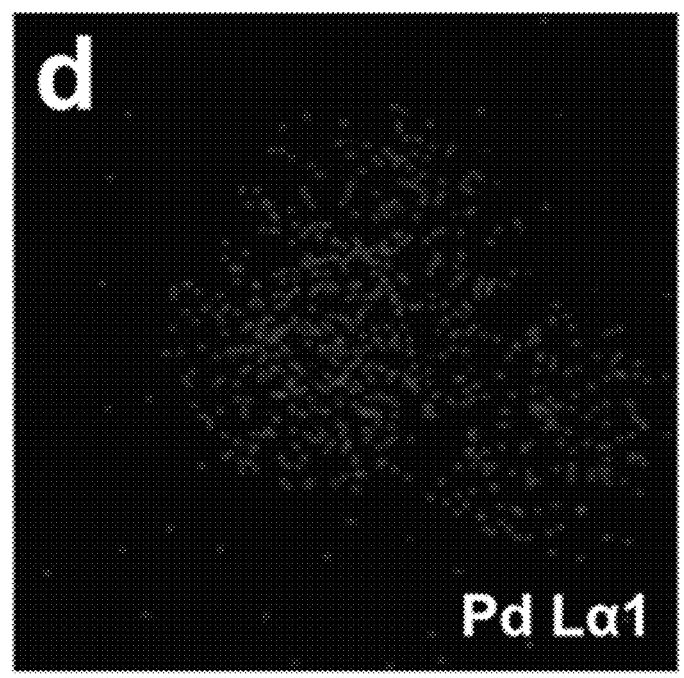
FIG. 3D shows an EFTEM analysis image of Pd metal nanoparticles.

FIG. 3A shows a HAADF-STEM (high-angle dark-field scanning transmission electron microscopy) image of Pd metal nanoparticles included in the photocatalyst according to Example 1, FIG. 3B shows an enlarged image of Pd metal nanoparticles represented by the circle in FIG. 3A, FIG. 3C shows an FFT (fast Fourier transform) diffraction pattern analysis image, and FIG. 3D shows an EFTEM analysis image of Pd metal nanoparticles.

With reference to FIGS. 3A to 3D, it was confirmed that the metal crystals of Cu and Pd located on rGO/TiO$_2$ were not mixed (alloyed foam) but were present separately (non-alloyed foam). Also, it was confirmed that Pd of the face-centered cubic (fcc) structure aligned along the Pd [0 −1 1] orientation exhibited a single crystal structure and that all constituent elements were Pd, indicating that Cu and Pd were located in an independent foam on rGO/TiO$_2$.

Test Example 3

Evaluation of Activity of Photocatalyst

A photocatalytic reaction was carried out by dispersing the photocatalyst according to the present disclosure in an aqueous solution for 30 seconds, performing purging with argon gas for 30 minutes to remove oxygen from the reactor, and irradiating the reactor with light at λ>320 nm.

Test Example 3-1

Evaluation of Activity of Photocatalyst Depending on Type Thereof

Figure 4A:
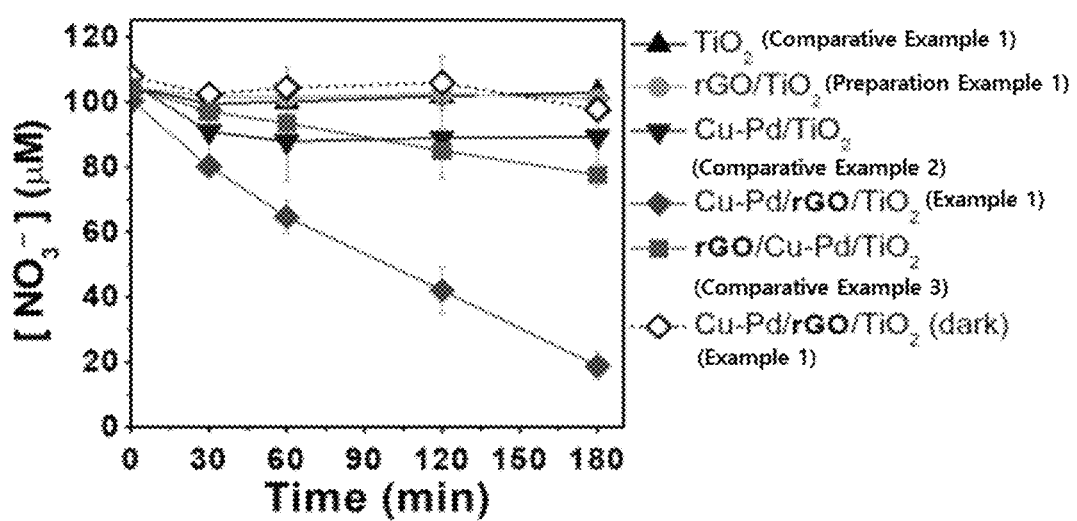
FIG. 4A is a graph showing the concentration of nitrate that is removed using various photocatalysts depending on the processing time.
Figure 4B:
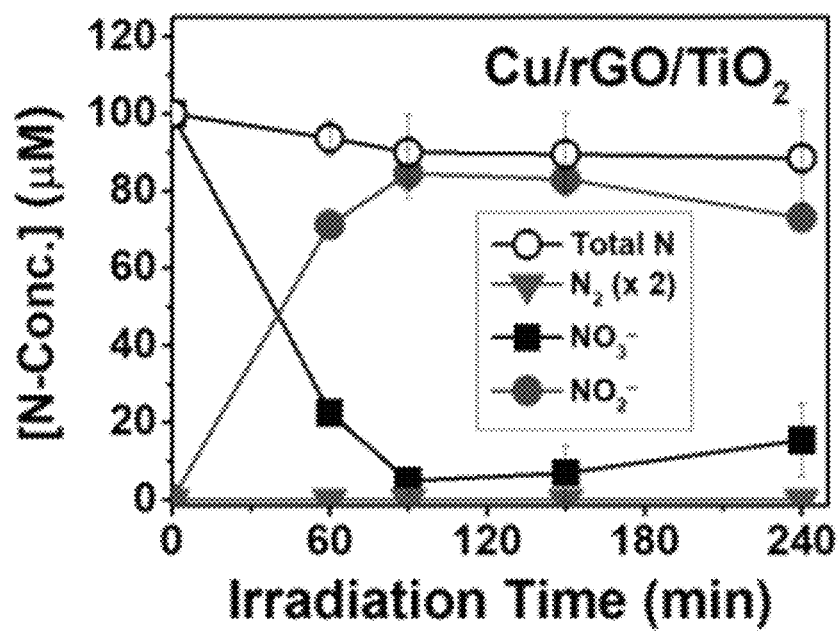
FIGS. 4B to 4E are graphs showing changes in nitrogen concentration when using respective catalysts according to Comparative Examples 4, 5 and 2 and Example 1.
Figure 4C:
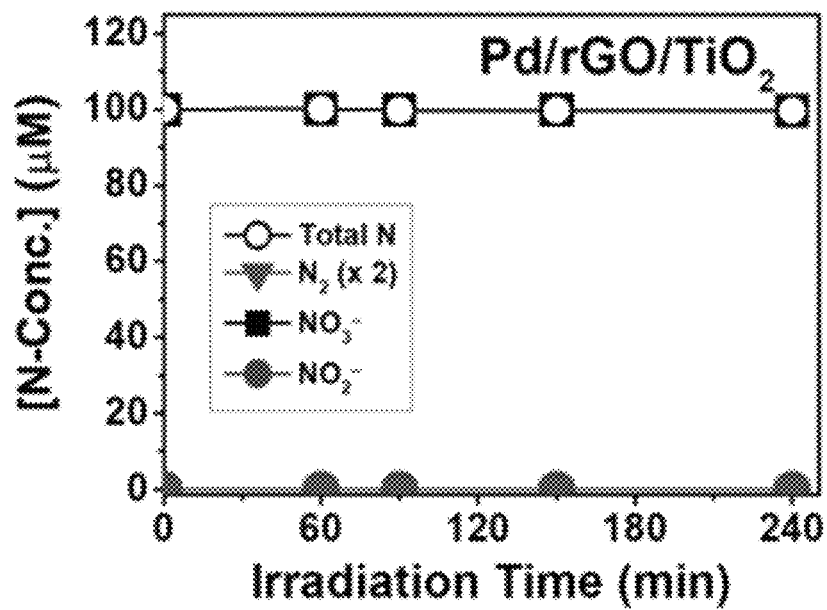
Figure 4D:
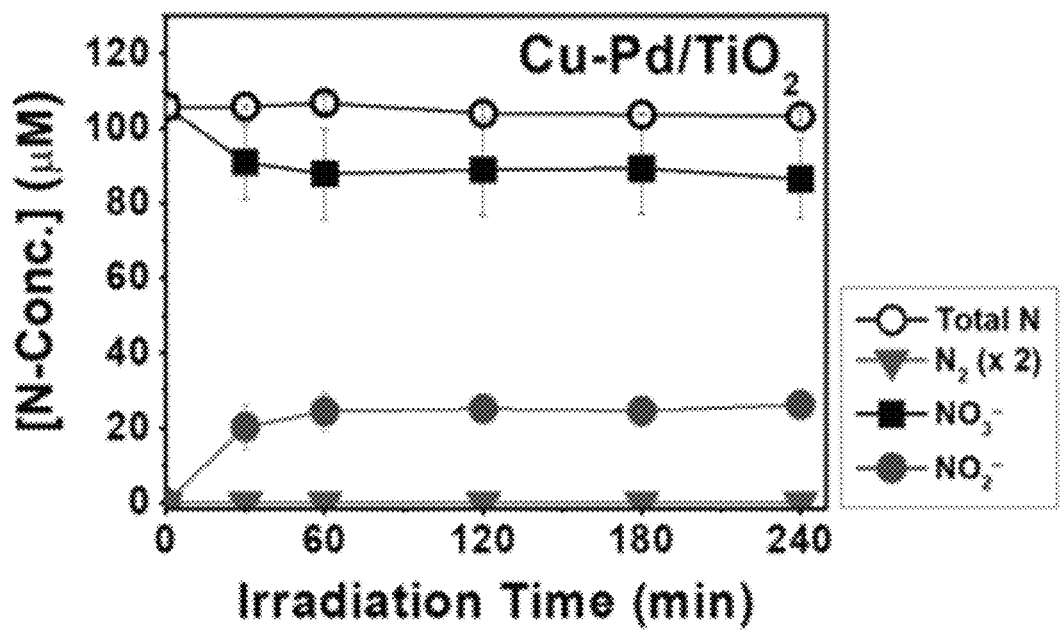
Figure 4E:
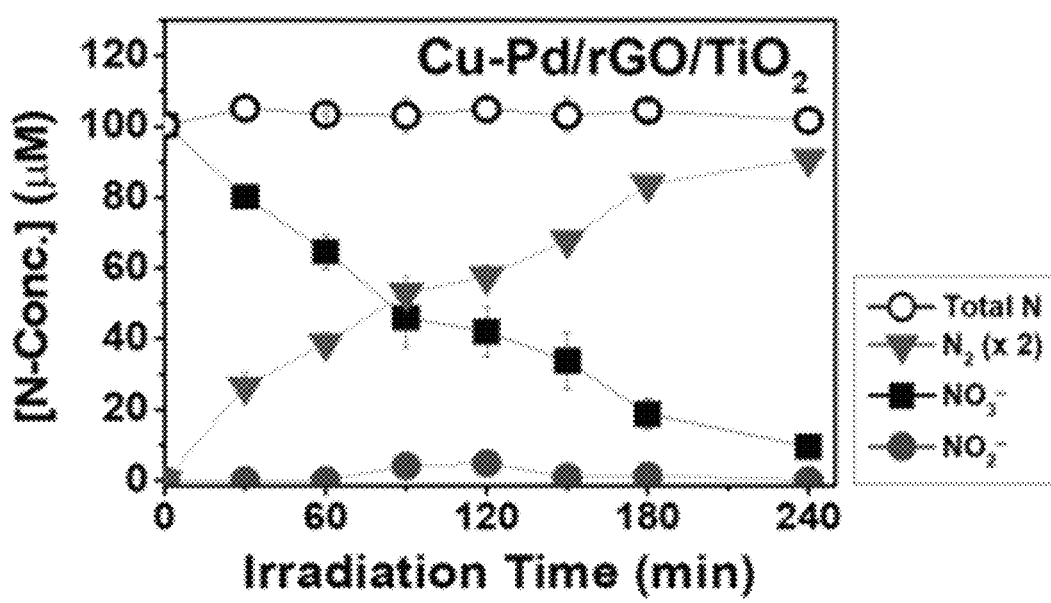
Figure 4F:
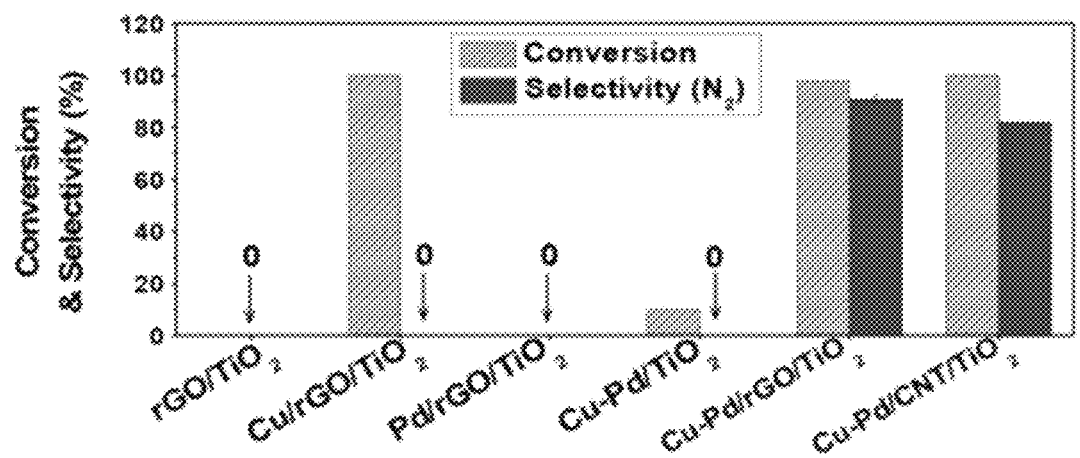
FIG. 4F is a graph showing nitrate removal efficiency (%) and selectivity (%) to nitrogen when using various photocatalysts.

FIG. 4A is a graph showing the concentration of nitrate that is removed using various photocatalysts depending on the processing time, FIGS. 4B to 4E are graphs showing changes in nitrogen concentration when using respective catalysts according to Comparative Examples 4, 5 and 2 and Example 1, and FIG. 4F is a graph showing nitrate removal efficiency (%) and selectivity (%) to nitrogen when using various photocatalysts.

Test Example 3-1 was performed under conditions of [catalyst]=1.5 g/L, [NO$_3^-$]$_0$=100 μM, an amount of each of rGO (or CNTs), Cu, and Pd of 1 wt %, pH=5.3-6.0 (not adjusted), initial Ar purging (de-aerated suspension), and irradiation with λ>320 nm.

With reference to FIG. 4A, photocatalytic activity was evaluated without the addition of an electron donor, and Comparative Example 1 (bare TiO$_2$) and Preparation Example 1 (rGO/TiO$_2$) had no photoactivity on NO$_3^-$ reduction, but the photocatalyst of Example 1 (Cu—Pd/rGO/TiO$_2$) was able to remove nitrate (NO$_3^-$) at the fastest rate, and the reaction did not occur without light irradiation (dark), indicating that the present reaction was caused by electrons generated by light. On the other hand, Comparative Example 3 (rGO/Cu—Pd/TiO$_2$), in which the rGO layer was deposited on Cu—Pd/TiO$_2$, significantly decreased nitrate (NO$_3^-$) removal efficiency, which means that the main active site for NO$_3^-$ reduction is the Cu—Pd bimetal, rather than the rGO layer.

With reference to FIGS. 4B to 4E, in the photocatalysts according to Comparative Example 4 (Cu/rGO/TiO$_2$) and Comparative Example 2 (Cu—Pd/TiO$_2$), it was confirmed that nitrate (NO$_3^-$) was reduced only into nitrite (NO$_2^-$) and was not further reduced into nitrogen gas, and Comparative Example 5 (Pd/rGO/TiO$_2$) was confirmed to have no effect of removing nitrate. This means that NO$_3^-$ cannot be reduced using Pd alone even in the presence of rGO. In contrast, Example 1 (Cu—Pd/rGO/TiO$_2$) was able to remove about 100% of NO$_3^-$ after photoreaction for 5 hours, and the removed nitrate ($NO_3^-$) was reduced while exhibiting 90% selectivity to nitrogen. This indicates that individual components (Cu, Pd, and rGO) play an essential role in the conversion of $NO_3^-$ into $N_2$.

With reference to FIG. 4F, when all of Cu, Pd, and rGO were present on $TiO_2$, high nitrate reduction efficiency and selectivity to nitrogen were exhibited. In addition, Example 2 (Cu—Pd/CNT/$TiO_2$), using carbon nanotubes (CNTs), as a representative carbon-based material, in lieu of rGO, exhibited effects similar to Example 1 (Cu—Pd/rGO/$TiO_2$). This demonstrates the common role of carbon-based charge transfer mediators in the denitrification reaction. However, Example 1 (Cu—Pd/rGO/$TiO_2$) exhibited higher selectivity in $N_2$ production than Example 2 (Cu—Pd/CNT/$TiO_2$).

Test Example 3-2

Evaluation of Activity of Photocatalyst Depending on Composition Thereof

Figure 5A:
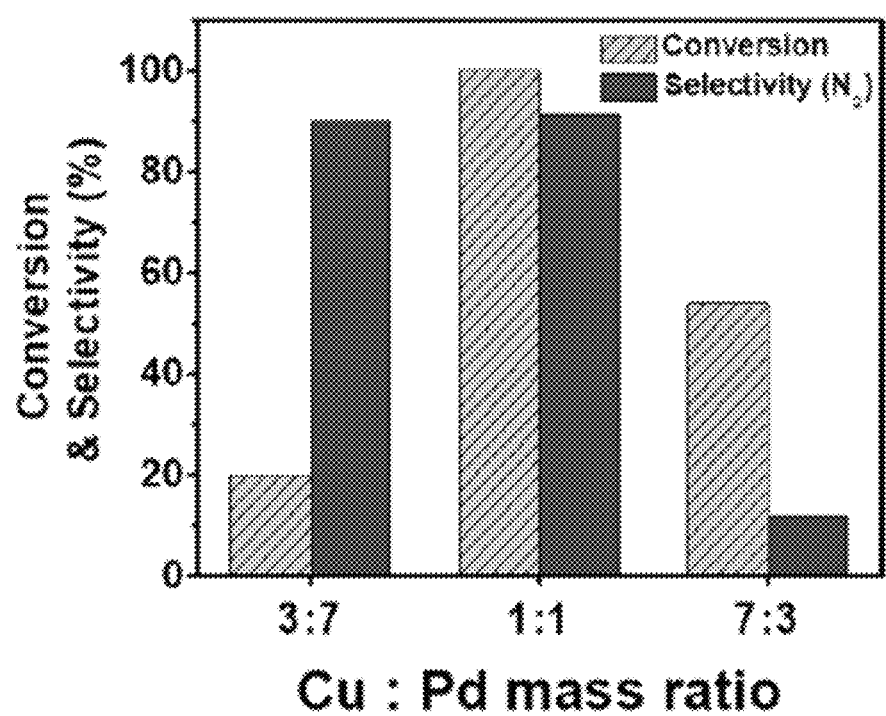
FIG. 5A is a graph showing the nitrate removal efficiency and selectivity to nitrogen depending on the ratio of bimetal Cu and Pd.
Figure 5B:
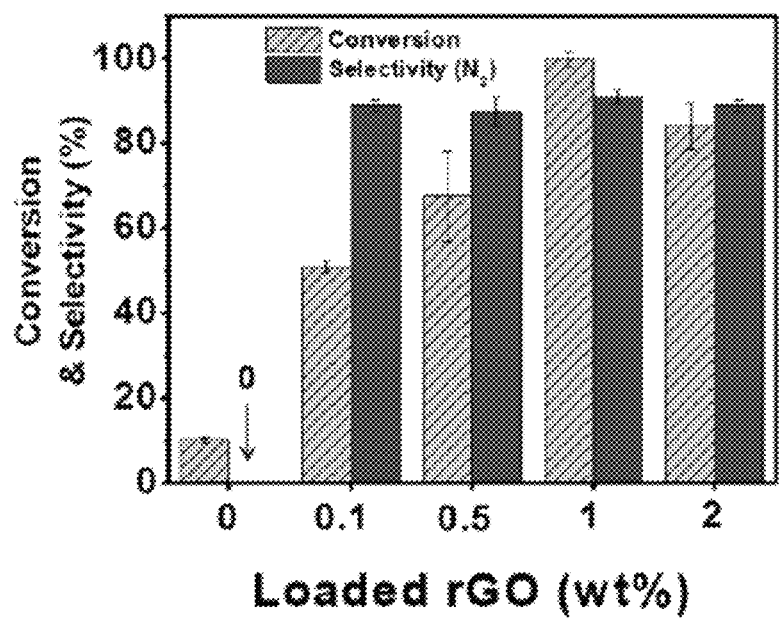
FIG. 5B is a graph showing the nitrate removal efficiency and selectivity to nitrogen depending on the amount of rGO.

FIG. 5A is a graph showing the nitrate removal efficiency and selectivity to nitrogen depending on the ratio of bimetal Cu and Pd, and FIG. 5B is a graph showing the nitrate removal efficiency and selectivity to nitrogen depending on the amount of rGO.

Test Example 3-2 was performed under conditions of [catalyst]=1.5 g/L, an amount of rGO of 1 wt % for (5A), an amount of each of Cu and Pd of 1 wt % for (5B), $[NO_3^-]_0$=100 μM, pH=5.3-6.4 (not adjusted), initial Ar purging (de-aerated suspension), and irradiation with 2>320 nm, and the total wt % of the deposited bimetal (Cu+Pd) was maintained at 2 wt %.

With reference to FIG. 5A, the optimal mass ratio of the bimetal Cu and Pd was 1:1, which showed the highest conversion and selectivity. When the amount of Pd was lower than the amount of Cu (Cu:Pd=7:3), the selectivity to $N_2$ was significantly lowered, which means that Pd is an active site for conversion of $NO_2^-$ into $N_2$. In addition, when the amount of Pd was increased (Cu:Pd=3:7), the selectivity to $N_2$ increased to about 90%, but the Cu site for conversion of $NO_3^-$ into $NO_2^-$ was absent, thus decreasing $NO_3^-$ conversion efficiency.

With reference to FIG. 5B, when the amount of rGO increased from 0 wt % to 0.1 wt %, the $NO_3^-$ conversion efficiency and selectivity to $N_2$ were greatly improved. This means that rGO greatly contributes to increasing nitrogen selectivity. When the amount of rGO was further increased, selectivity was not significantly affected, but the $NO_3^-$ conversion efficiency gradually increased while the amount of rGO reached a plateau of 1 wt % or more.

Therefore, the optimal composition of the catalyst according to Example 1 (Cu—Pd/rGO/$TiO_2$) was composed of 1 wt % Cu, 1 wt % Pd and 1 wt % rGO, indicative of the highest denitrification efficiency and selectivity to nitrogen.

Test Example 3-3

Evaluation of Activity of Photocatalyst Depending on pH

Figure 6A:
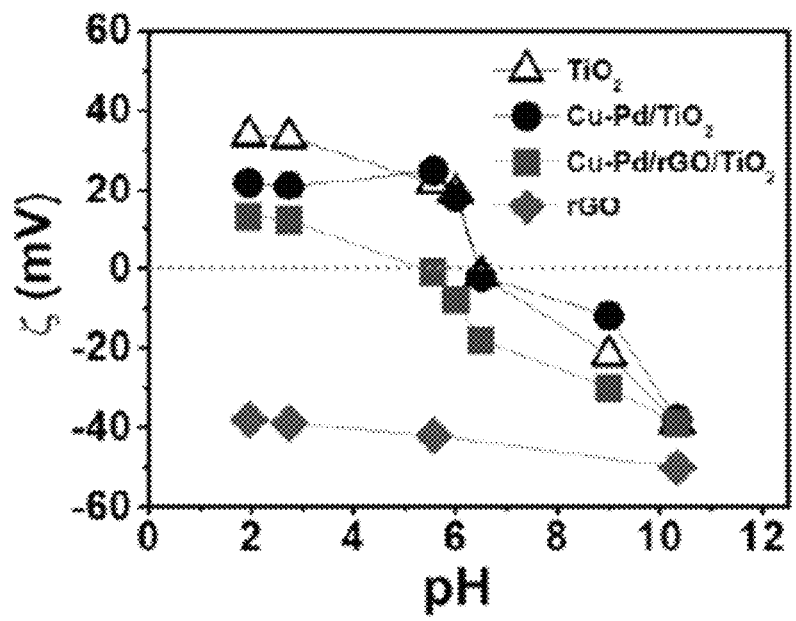
FIG. 6A is a graph showing Zeta potential depending on the pH of the photocatalyst in a 1 mM $NaNO_3$ electrolyte solution.
Figure 6B:
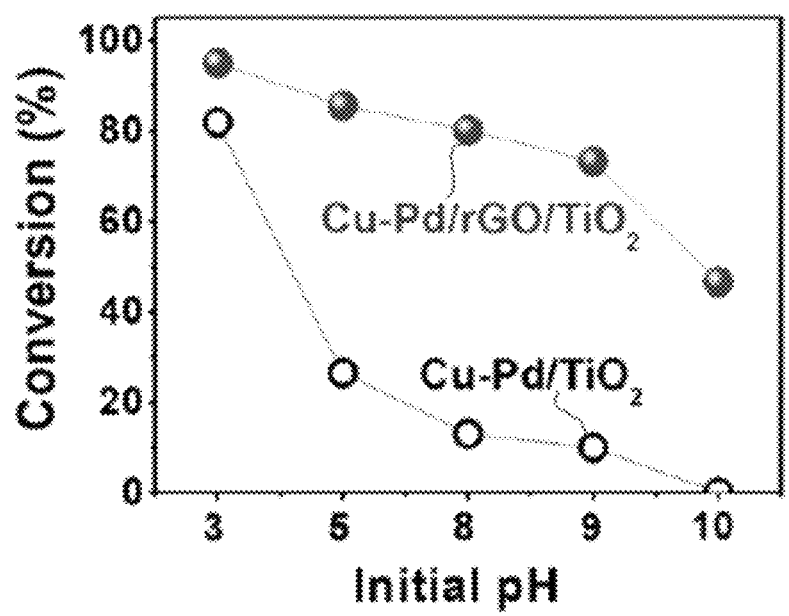
FIG. 6B is a graph showing the nitrate reduction rate when using the photocatalysts according to Example 1 and Comparative Example 2.
Figure 6C:
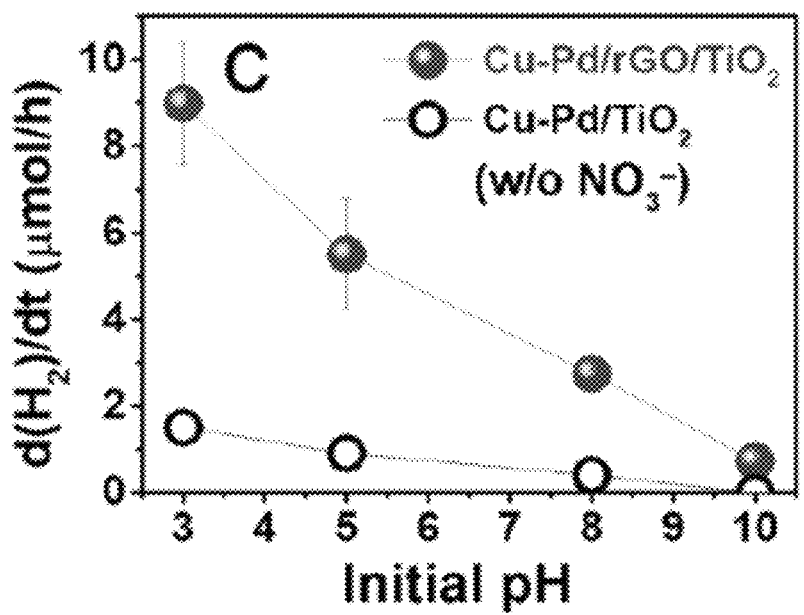
FIG. 6C is a graph showing the amount of hydrogen that is produced depending on the processing time according to Example 1 and Comparative Example 2.

FIG. 6A is a graph showing Zeta potential depending on the pH of the photocatalyst in a 1 mM $NaNO_3$ electrolyte solution, FIG. 6B is a graph showing the nitrate reduction rate when using the photocatalysts according to Example 1 and Comparative Example 2, and FIG. 6C is a graph showing the amount of hydrogen that is produced depending on the processing time according to Example 1 and Comparative Example 2.

Test Example 3-3 was performed under conditions of [catalyst]=2 mg/L for (6A), 1.5 g/L for (6B) and (6C), an amount of each of rGO, Cu, and Pd of 1 wt %, $[NO_3^-]_0$=100 μM for (6B), initial Ar purging (de-aerated suspension), and irradiation with λ>320 nm for (6B) and (6C).

With reference to FIGS. 6A and 6B, rGO exhibited a negative (−) surface charge value across the entire pH range, and a smaller negative value appeared due to the presence of rGO in Example 1 (Cu—Pd/rGO/$TiO_2$) than in Comparative Example 2 (Cu—Pd/$TiO_2$). In addition, the nitrate reduction efficiency decreased with an increase in the pH in both catalysts, but the efficiency remained higher in Example 1 (Cu—Pd/rGO/$TiO_2$), indicating that the presence of rGO promoted electron transfer from $TiO_2$ to bimetal (Cu—Pd).

With reference to FIG. 6C, the right downward trend is shown as in FIGS. 6A and 6B, and Example 1 (Cu—Pd/rGO/$TiO_2$) exhibited higher $H_2$ production activity than Comparative Example 2 (Cu—Pd/$TiO_2$) across a wide pH range. In both Example 1 and Comparative Example 2, the activity decreased with an increase in pH.

Based thereon, the surface charge of Example 1 (Cu—Pd/rGO/$TiO_2$) becomes a smaller negative (−) value due to the presence of rGO, which allows more $H^+$ present in water to be distributed around rGO. Moreover, $2H^+$ receives two electrons to produce more $H_2$. $H_2$ is used as the only reducing agent in the present study, and the increased amount of hydrogen can be explained as the reason for the increase in the reduction rate of nitrate. In addition, as the pH increases, the amount of $H^+$ remaining in water decreases, resulting in decreased activity, which is the basis for explaining this result.

Test Example 3-4

Figure 7A:
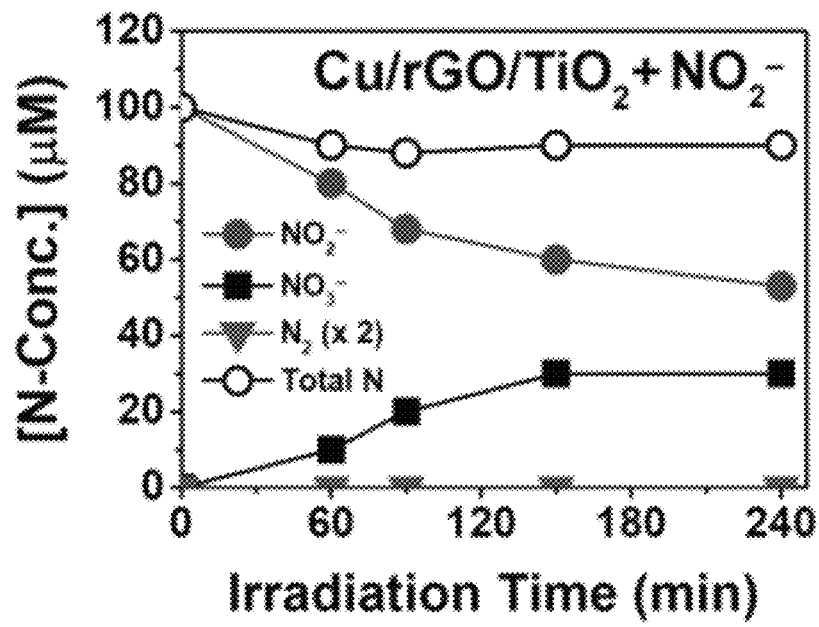
FIGS. 7A to 7D are graphs showing changes in the concentration of nitrite (intermediate) depending on the light irradiation time when using the photocatalysts according to Comparative Examples 2, 4 and 5 and Example 1.
Figure 7B:
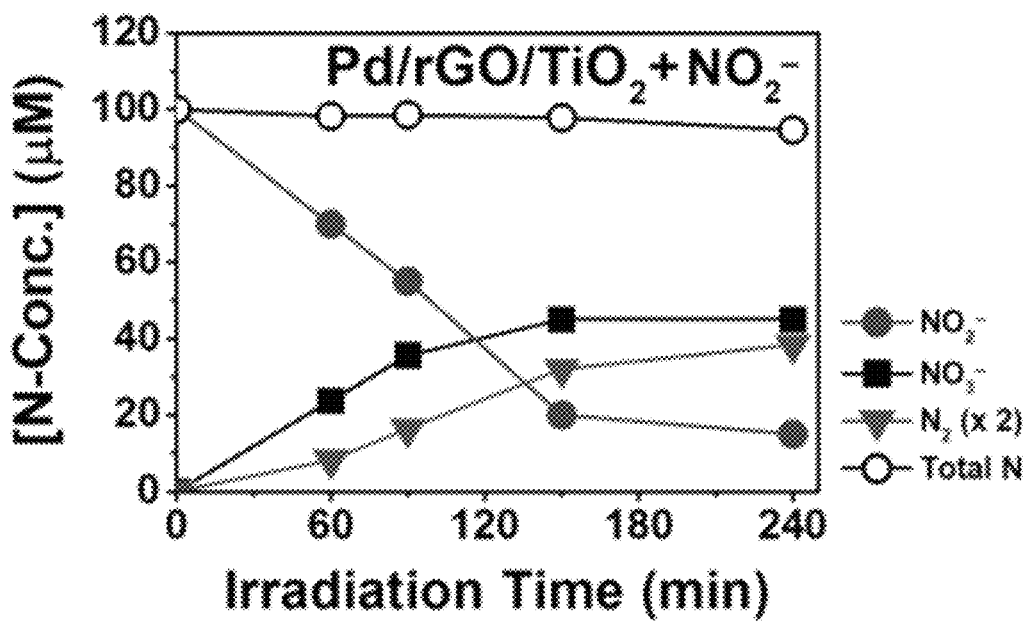
Figure 7C:
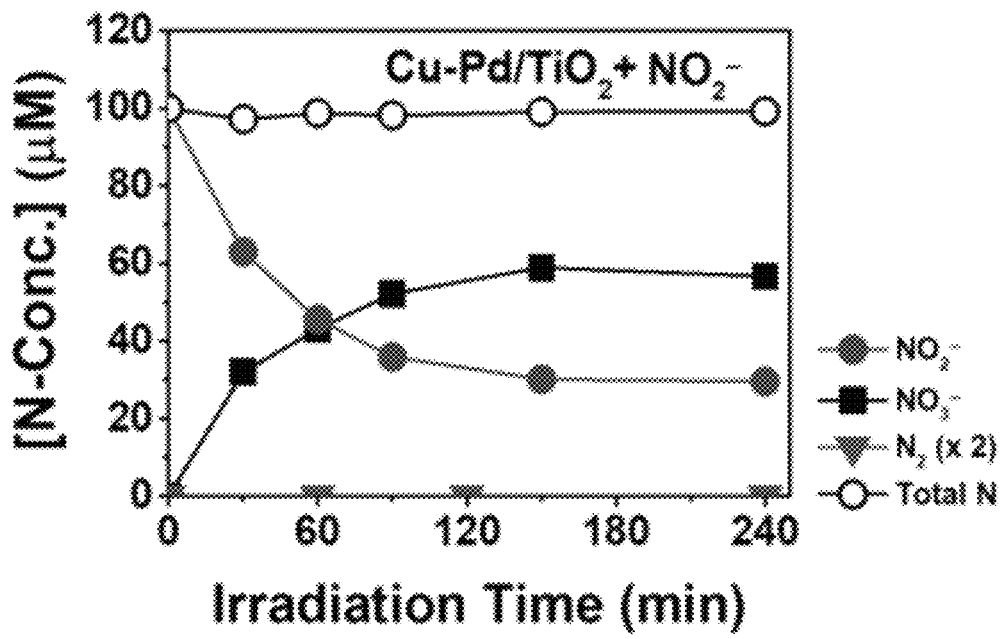
Figure 7D:
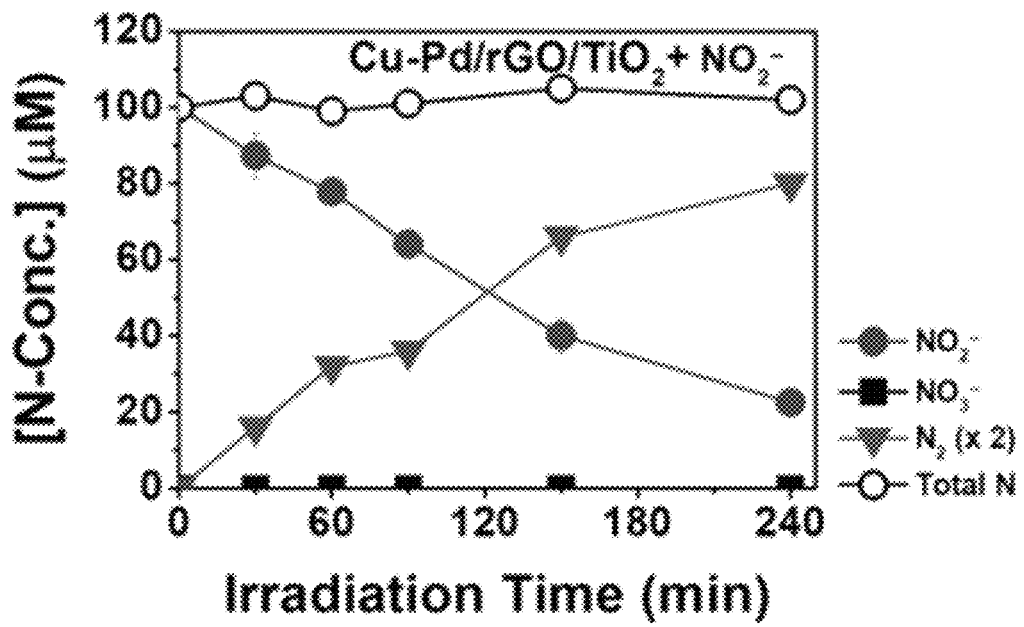
Figure 7E:
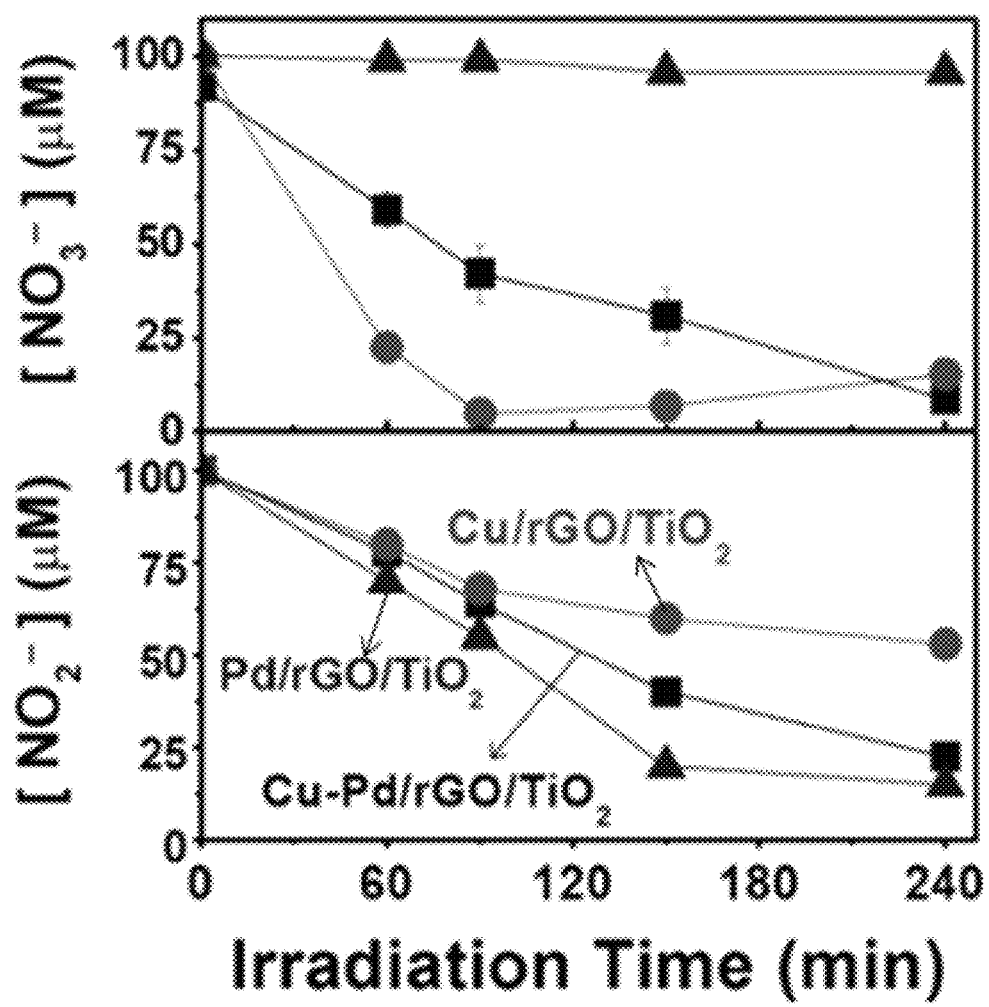
FIG. 7E is a graph showing changes in the concentration of nitrite (intermediate) depending on the light irradiation time when using the photocatalysts according to Comparative Examples 4 and 5 and Example 1.
Figure 7F:
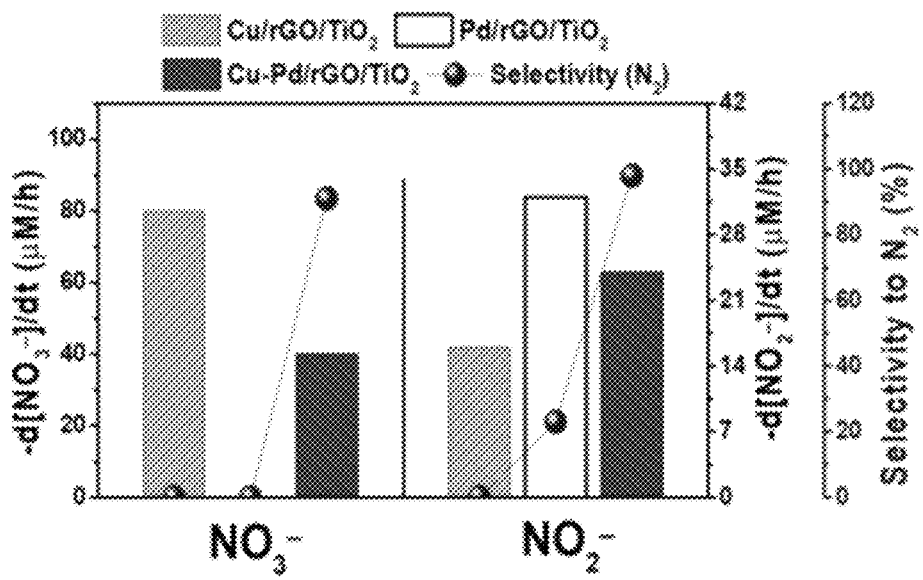
FIG. 7F is a graph showing the rate of removal of nitrate and nitrite and the selectivity to nitrogen when using the photocatalysts according to Comparative Examples 4 and 5 and Example 1.

Changes in Concentration of Nitrite (Intermediate) Depending on Light Irradiation Time FIGS. 7A to 7D are graphs showing changes in the concentration of nitrite (intermediate) depending on the light irradiation time when using the photocatalysts according to Comparative Examples 2, 4 and 5 and Example 1, FIG. 7E is a graph showing changes in the concentration of nitrite (intermediate) depending on the light irradiation time when using the photocatalysts according to Comparative Examples 4 and 5 and Example 1, and FIG. 7F is a graph showing the rate of removal of nitrate and nitrite and the selectivity to nitrogen when using the photocatalysts according to Comparative Examples 4 and 5 and Example 1.

Test Example 3-4 was performed under conditions of [catalyst]=1.5 g/L, an amount of each of rGO, Cu, and Pd of 1 wt %, $[NO_2^-]_0$=100 μM for (7A-7F), $[NO_3^-]_0$=100 μM for (7E) and (7F), initial Ar purging (de-aerated suspension), pH=5.3-6.0, and irradiation with λ>320 nm.

With reference to FIGS. 7A to 7F, it was confirmed that nitrite ($NO_2^-$) was reoxidized to thus produce nitrate ($NO_3^-$) when using the photocatalysts according to Comparative Example 4 (Cu/rGO/$TiO_2$), Comparative Example 5 (Pd/rGO/$TiO_2$) and Comparative Example 2 (Cu—Pd/$TiO_2$). On the other hand, when using Example 1 (Cu—Pd/rGO/$TiO_2$), $NO_3^-$ was not generated at all, and $NO_2^-$ was completely converted into nitrogen ($N_2$).

In Example 1 (Cu—Pd/rGO/$TiO_2$), Cu is a metal cocatalyst used to reduce nitrate to nitrite, and Pd is a metal cocatalyst capable of reducing nitrite to nitrogen gas using hydrogen as a reducing agent. As such, in Comparative Example 4 (Cu/rGO/TiO$_2$), the reaction rate for nitrate was the fastest, but the selectivity to nitrogen was remarkably low due to the phenomenon by which nitrate was reduced again into nitrite. In Comparative Example 5 (Pd/rGO/TiO$_2$), the reactivity with nitrate was negligibly small, but the reactivity with nitrite was the fastest, based on which it was confirmed that selectivity to nitrogen was low due to reoxidation of some nitrite compared to when using Example 1 (Cu—Pd/rGO/TiO$_2$).

Therefore, Example 1 was able to convert NO$_3^-$ and NO$_2^-$ into N$_2$, indicating that the presence of both Cu and Pd on TiO$_2$ is essential for the denitrification process. Moreover, it was confirmed for Example 1 (Cu—Pd/rGO/TiO$_2$) that NO$_3^-$ was first converted into NO$_2^-$ due to the presence of Cu, and that NO$_2^-$ was then immediately converted into N$_2$ as soon as NO$_2^-$ was generated due to the presence of Pd.

Test Example 3-5

Figure 8A:
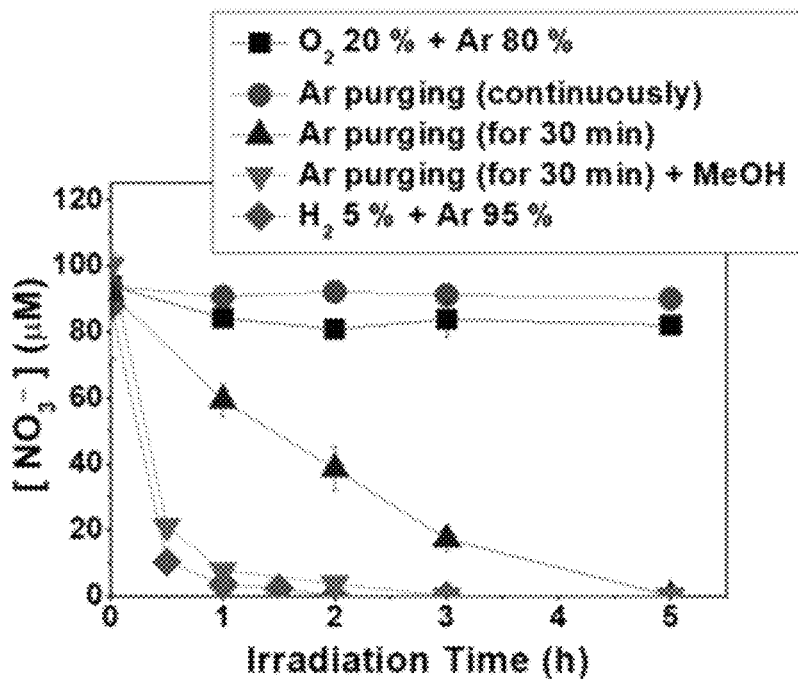
FIG. 8A is a graph showing the extent of removal of nitrate ions using different gases in a reactor depending on the light irradiation time.
Figure 8B:
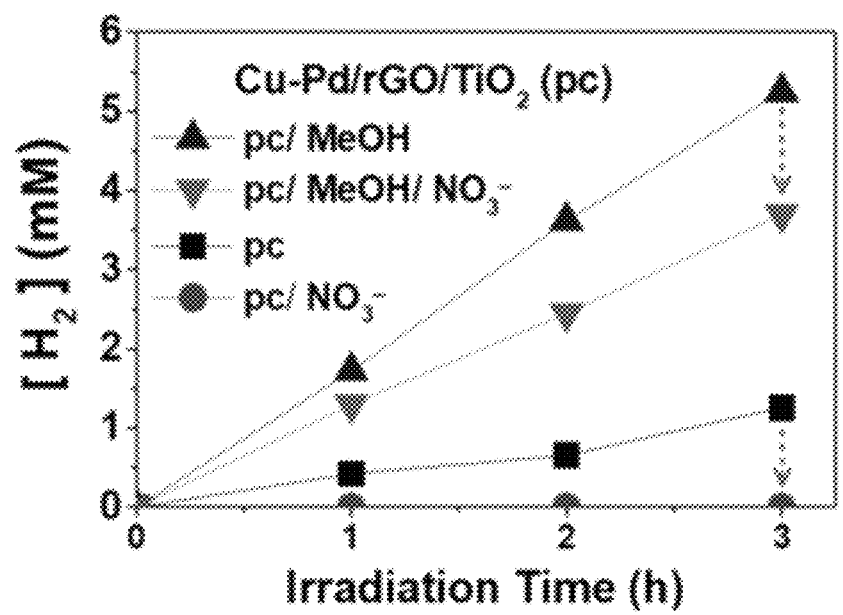
FIG. 8B is a graph showing the production of hydrogen ($H_2$) depending on the presence or absence of nitrate and methanol.
Figure 8C:
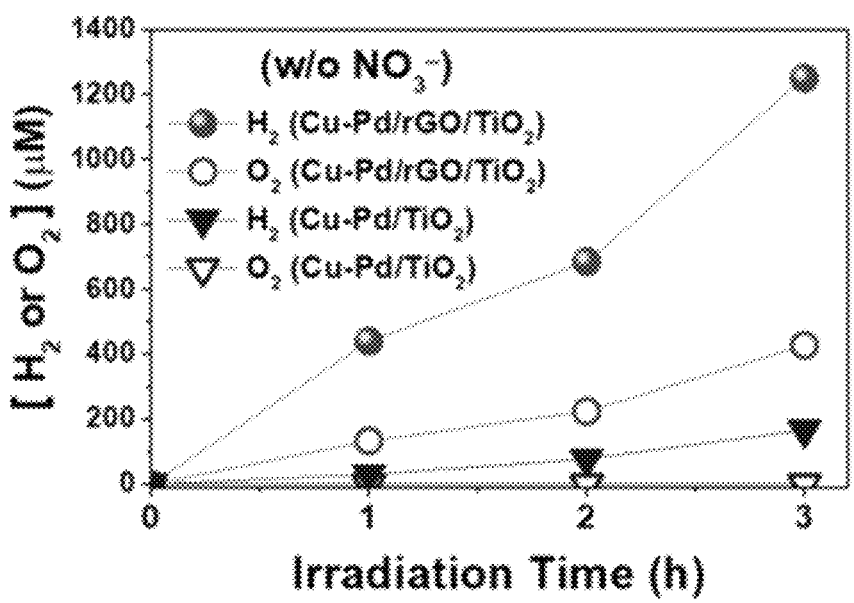
FIG. 8C is a graph showing the production of oxygen ($O_2$) and hydrogen ($H_2$) when using the photocatalysts according to Example 1 and Comparative Example 2.

Evaluation of Activity of Photocatalyst Depending on Presence or Absence of Electron Donor (Methanol) and Purging with Various Gases FIG. 8A is a graph showing the extent of removal of nitrate ions using different gases in a reactor depending on the light irradiation time, FIG. 8B is a graph showing the production of hydrogen (H$_2$) depending on the presence or absence of nitrate and methanol, and FIG. 8C is a graph showing the production of oxygen (O$_2$) and hydrogen (H$_2$) when using the photocatalysts according to Example 1 and Comparative Example 2.

Test Example 3-5 was performed under conditions of [catalyst]=1.5 g/L, an amount of each of rGO, Cu, and Pd of 1 wt %, [NO$_3^-$]$_0$=100 μM, pH=5.3-6.0 (not adjusted), initial gas purging or continuous Ar purging, irradiation with λ>320 nm, and [MeOH]=10 vol % (when indicated in (8A) and (8B)). The purpose of the present test is to confirm the reducing agent in the denitrification reaction using the catalyst according to Example 1.

With reference to FIG. 8A, it can be confined that when oxygen was present in the reactor, electrons could not be transferred to H$^+$ due to the rapid reactivity of oxygen with electrons, so almost no nitrate ions were reduced. In addition, when Ar, which is an inert gas, was continuously supplied into the reactor, hydrogen gas generated during the reaction did not participate in the reaction but was discharged to the outside of the reactor through a purging needle, and thus the nitrate ion reduction efficiency decreased drastically compared to the case of purging with argon (Ar) gas for 30 minutes. On the other hand, when methanol (MeOH), which is an electron donor, was supplied, the same rapid nitrate ion reduction was observed as when H$_2$ gas was supplied to the reactor. This is the basis for explaining that hydrogen gas produced by light was used as a reducing agent for nitrate ions.

With reference to FIG. 8B, the amount of hydrogen generated when using methanol (electron donor) was remarkably increased, but the amount of hydrogen generated when nitrate ions (NO$_3^-$) were present in the aqueous solution was decreased, regardless of the presence or absence of the electron donor. This is the basis for supporting the notion that hydrogen generated during the photoreaction was used as a reducing agent in the denitrification reaction.

With reference to FIG. 8C, O$_2$ was produced by oxidizing water due to photo-generated holes when using Example 1 (Cu—Pd/rGO/TiO$_2$), whereas O$_2$ was not produced when using Comparative Example 2 (Cu—Pd/TiO$_2$) not including rGO. Therefore, by introducing rGO to enable a complete water decomposition reaction, a larger amount of hydrogen can be produced even without an electron donor, and nitrate ions can be ultimately reduced into nitrogen gas.

Test Example 4

Electrochemical Experiment of Photocatalyst

Figure 9A:
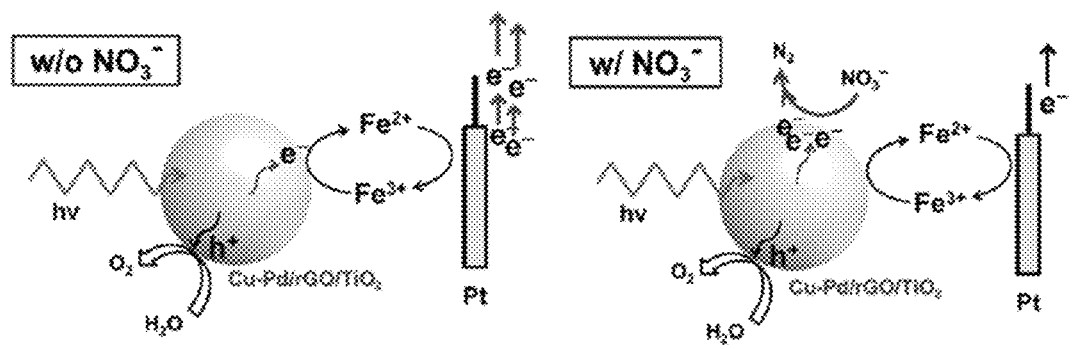
FIG. 9A shows a photocurrent collection process depending on the presence or absence of nitrate in a photocatalyst.
Figure 9B:
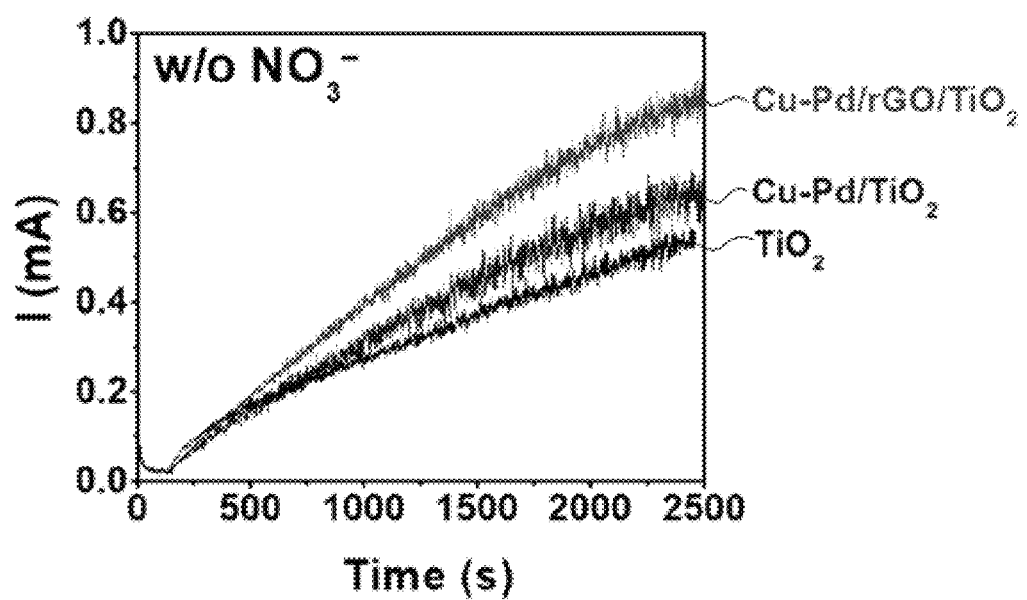
FIGS. 9B and 9C are graphs showing changes in $Fe^{3+}$-mediated photocurrent when using the photocatalysts according to Comparative Examples 1 and 2 and Example 1 depending on the presence or absence of nitrate under irradiation with UV light ($\lambda$>320 nm)
Figure 9C:
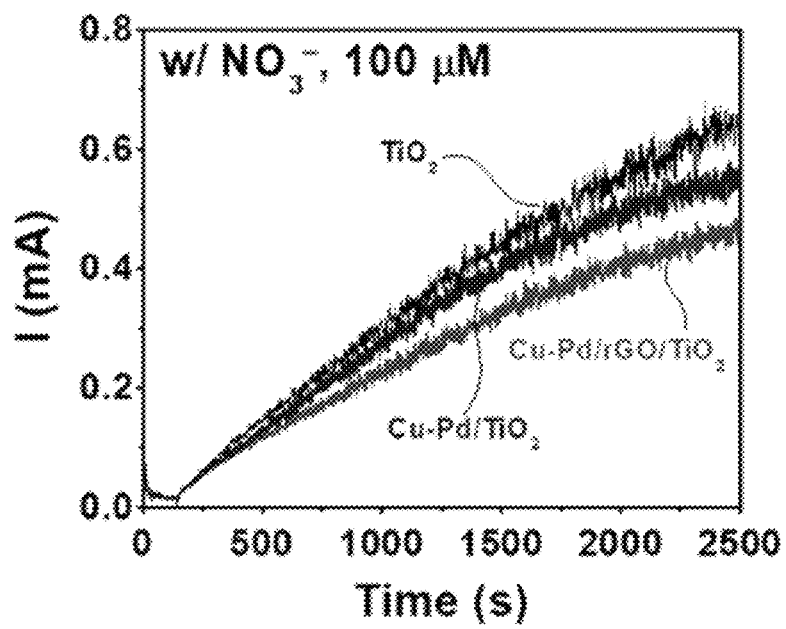
Figure 9D:
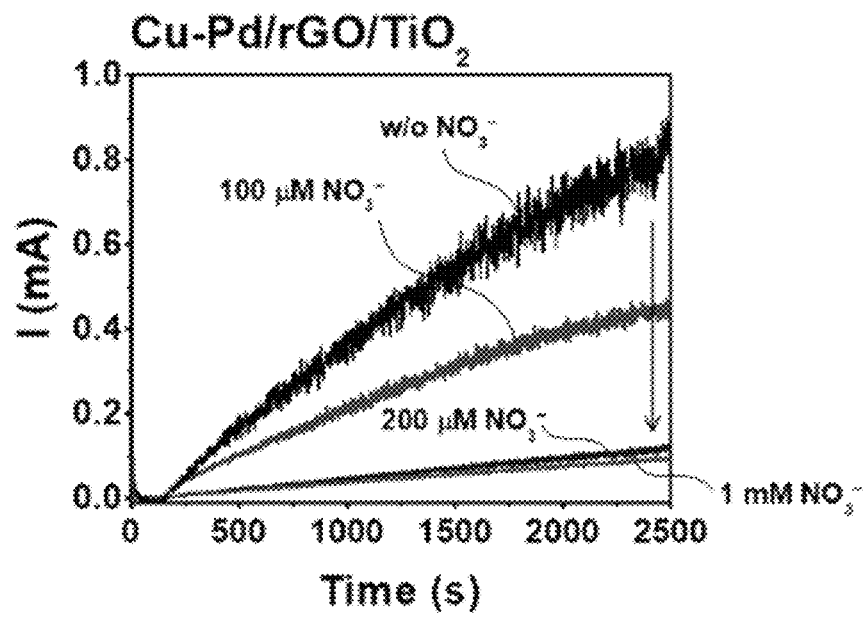
FIG. 9D is a graph showing changes in $Fe^{3+}$-mediated photocurrent depending on the concentration of nitrate in the presence of Example 1.
Figure 9E:
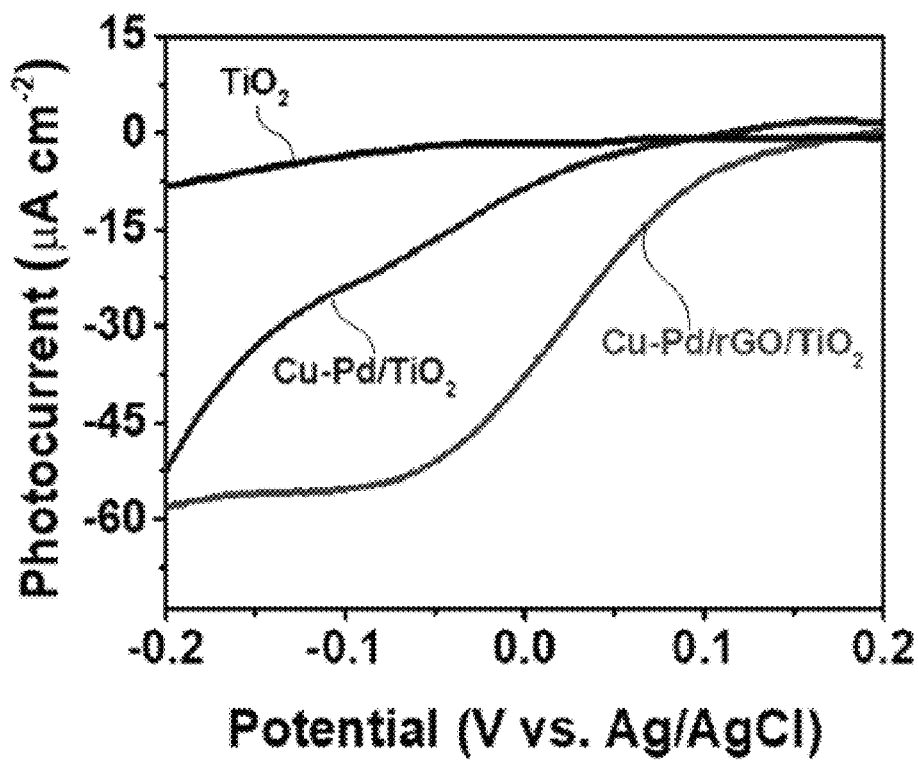
FIG. 9E is a graph showing changes in photocurrent depending on the potential at a scan speed of 2 mV/s (−0.2 to +0.2 $V_{Ag/AgCl}$) of Comparative Examples 1 and 2 and Example 1.

FIG. 9A shows a photocurrent collection process depending on the presence or absence of nitrate in a photocatalyst, FIGS. 9B and 9C are graphs showing changes in Fe$^{3+}$-mediated photocurrent when using the photocatalysts according to Comparative Examples 1 and 2 and Example 1 depending on the presence or absence of nitrate under irradiation with UV light (λ>320 nm), FIG. 9D is a graph showing changes in Fe$^{3+}$-mediated photocurrent depending on the concentration of nitrate in the presence of Example 1, and FIG. 9E is a graph showing changes in photocurrent depending on the potential at a scan speed of 2 mV/s (−0.2 to +0.2 V$_{Ag/AgCl}$) of Comparative Examples 1 and 2 and Example 1.

The photoelectrochemical (PEC) measurement in Test Example 4 was conducted in two types, that is, electrode type and slurry type, and was performed in a typical 3-electrode PEC reactor connected to a potentiostat (Gamry, Reference 600).

For the electrode-type PEC experiment, the photocatalyst (Comparative Examples 1 and 2 and Example 1) was mixed with a methanol binder, applied on FTO glass using a doctor blade, and heat-treated in an electric furnace at 450° C. for 1 hour, thus manufacturing a catalyst-coated electrode. Then, in a 0.1 M NaClO$_4$ electrolyte, the catalyst-coated electrode, a coiled Pt wire and an Ag/AgCl electrode were used as an anode, a cathode and a reference electrode, respectively, a voltage of +0.7 V (λ>320 nm) was applied under UV irradiation, and the reactor was continuously purged with Ar gas for the experiment.

For the slurry-type PEC experiment, a Pt electrode and an electron shuttle (a reversible redox mediator of Fe$^{3+}$/Fe$^{2+}$) were used in a suspension made by dispersing the photocatalyst (Comparative Examples 1 and 2 and Example 1), and specifically, coiled Pt, graphite rod, and Ag/AgCl electrode were used as an anode, a cathode and a reference electrode, respectively. During the experiment, a voltage of +0.7 V was applied.

With reference to FIG. 9A, the slurry-type photocurrent measurement process can be seen, and the presence of metal nanoparticles (Cu—Pd) and rGO decreases electron-hole recombination through electron trapping and accelerates the transfer of electrons to Fe$^{3+}$ at the interface. Also, the photocurrent is collected through Fe$^{3+}$/Fe$^{2+}$ redox reaction serving as the electron shuttle in the suspension of the photocatalyst.

With reference to FIGS. 9B to 9D, the electrons generated from the photocatalyst in the suspension created current, and the generated photocurrent was increased in the order of Comparative Example 1 (bare TiO$_2$), Comparative Example 2 (Cu—Pd/TiO$_2$) and Example 1 (Cu—Pd/rGO/TiO$_2$), in the absence of nitrate ions (NO$_3^-$). On the other hand, the order of generation of the photocurrent was reversed in the presence of NO$_3^-$. The reason for this is that, when nitrate ions (NO$_3^-$) exist together in the suspension, they have to compete with Fe$^{3+}$ ions in accommodating the generated electrons. The better the catalyst reduces nitrate ions, the lower the generated photocurrent value. Moreover, in Example 1 (Cu—Pd/rGO/TiO$_2$), the generation of photocurrent decreased with an increase in the concentration of [NO$_3^-$]. This indicates that, in Example 1 (Cu—Pd/rGO/TiO$_2$), electrons are more preferentially transferred to NO$_3^-$ than to Fe$^{3+}$. That is, in the catalyst containing both Cu—Pd and rGO, electrons in the conduction band (CB) selectively reacted with NO$_3^-$.

With reference to FIG. 9E, in the electrode-type photocurrent experiment using the catalyst-coated electrode, the photoreduction current was increased in the order of Comparative Example 1 (bare TiO$_2$), Comparative Example 2 (Cu—Pd/TiO$_2$), and Example 1 (Cu—Pd/rGO/TiO$_2$), which is consistent with the results of FIG. 9B. Therefore, it was confirmed that loading of bimetal (Cu—Pd) and rGO on TiO$_2$ not only accelerated the electron transfer rate, but also decreased the minimum potential value at which it is possible to generate hydrogen by reducing water.

Test Example 5

Time-Resolved Photoluminescence (TRPL) Analysis of Photocatalyst

Figure 10A:
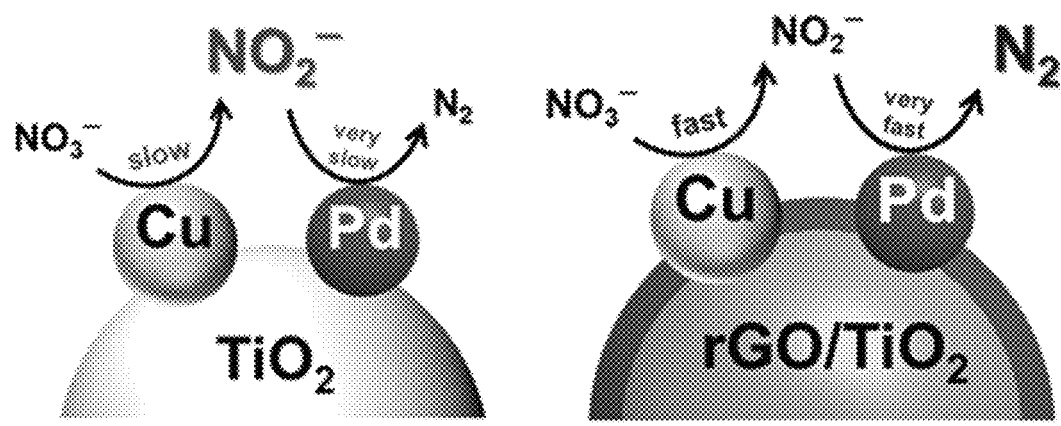
FIG. 10A schematically shows the denitrification reaction using the photocatalyst according to Example 1.
Figure 10B:
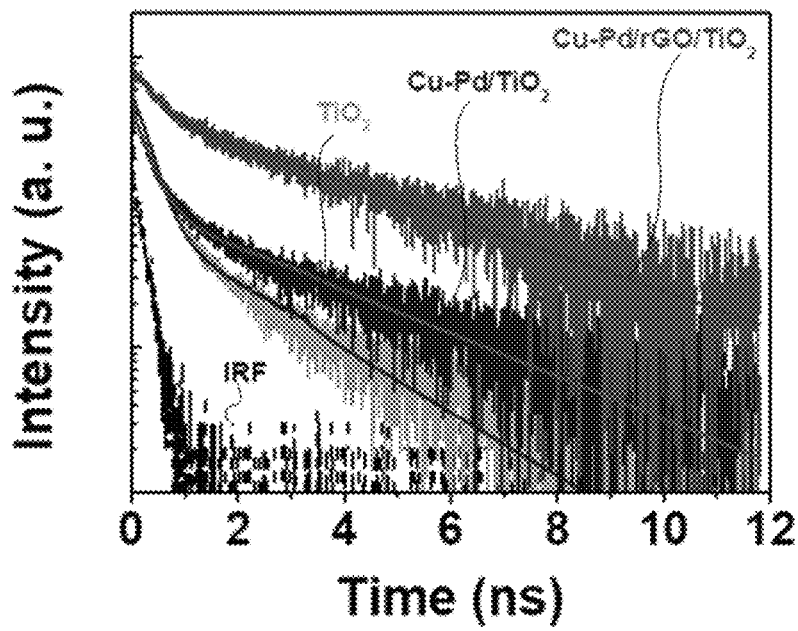
FIG. 10B is a graph showing the results of analysis of time-resolved photoluminescence (TRPL) of the photocatalyst according to Example 1 and Comparative Examples 1 and 2.

FIG. 10A schematically shows the denitrification reaction using the photocatalyst according to Example 1, and FIG. 10B is a graph showing the results of analysis of time-resolved photoluminescence (TRPL) of the photocatalyst according to Example 1 and Comparative Examples 1 and 2.

Time-resolved photoluminescence (TRPL) spectroscopy was performed at 420-600 nm (λex=400 nm), and the full width at half maximum (FWHM) of the instrument response function (IRF) was measured to be 46 ps. Also, the amount of each of rGO, Cu, and Pd was 1 wt %.

With reference to FIG. 10A, the reaction in which NO$_3^-$ ions are reduced into NO$_2^-$ during denitrification is known to be a rate-determining step. Unlike Comparative Example 2 (Cu—Pd/TiO$_2$), which is the most widely known denitrification catalyst, it was confirmed that NO$_2^-$ was not produced during the denitrification reaction in Example 1 (Cu—Pd/rGO/TiO$_2$). This is deemed to be due to rapid electron transfer to the bimetal (Cu—Pd) supported on the rGO matrix. Cu, serving as a promoter cocatalyst, allows high activation energy to be overcome, and Pd, serving as a hydrogenation catalyst, allows a larger amount of hydrogen to be produced, thereby making it possible to quickly reduce the intermediate NO$_2^-$ into N$_2$. This phenomenon confirms the role of rGO as a charge transfer mediator.

With reference to FIG. 10B, the recombination behavior of electrons and holes in Example 1 (Cu—Pd/rGO/TiO$_2$), Comparative Example 1 (bare TiO$_2$) and Comparative Example 2 (Cu—Pd/TiO$_2$) was analyzed. Recombination of charges (electrons and holes) was greatly suppressed by the presence of bimetal and rGO, which is consistent with the highest photocatalytic activity of Example 1 (Cu—Pd/rGO/TiO$_2$). The average lifetime of the generated charges was 50.0 ps in Comparative Example 1 (bare TiO$_2$), but was greatly increased to 532.9 ps in Example 1 (Cu—Pd/rGO/TiO$_2$). This means that the charge pair generated in Example 1 (Cu—Pd/rGO/TiO$_2$) is sustained much longer due to the promoted electron transfer to metal and rGO, which increases the possibility of interfacial electron transfer (i.e. nitrate reduction).

Test Example 6

Quantum Efficiency Calculation and Stability Analysis of Photocatalyst

Figure 11A:
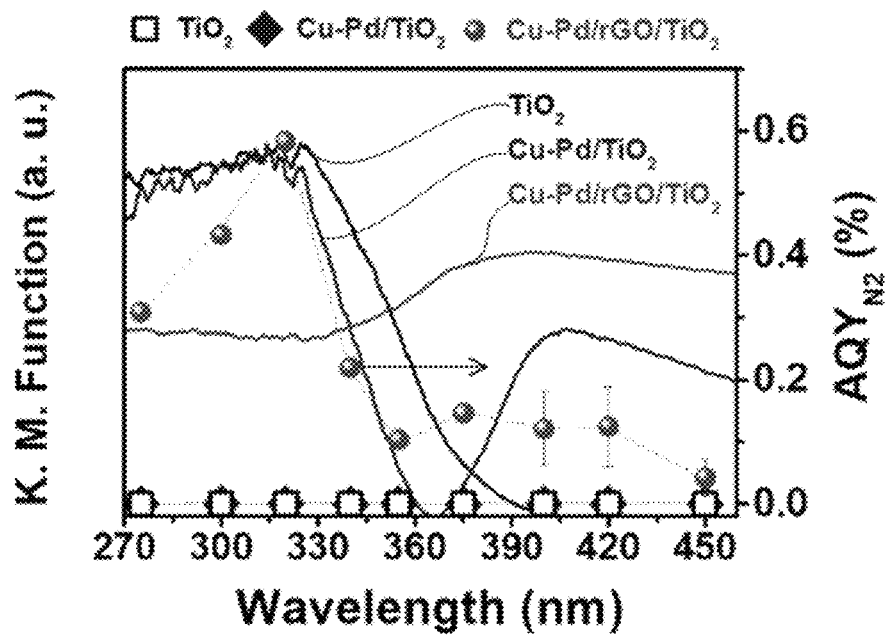
FIG. 11A is a graph showing the denitrification reaction efficiency depending on the wavelength of Comparative Examples 1 and 2 and Example 1.
Figure 11B:
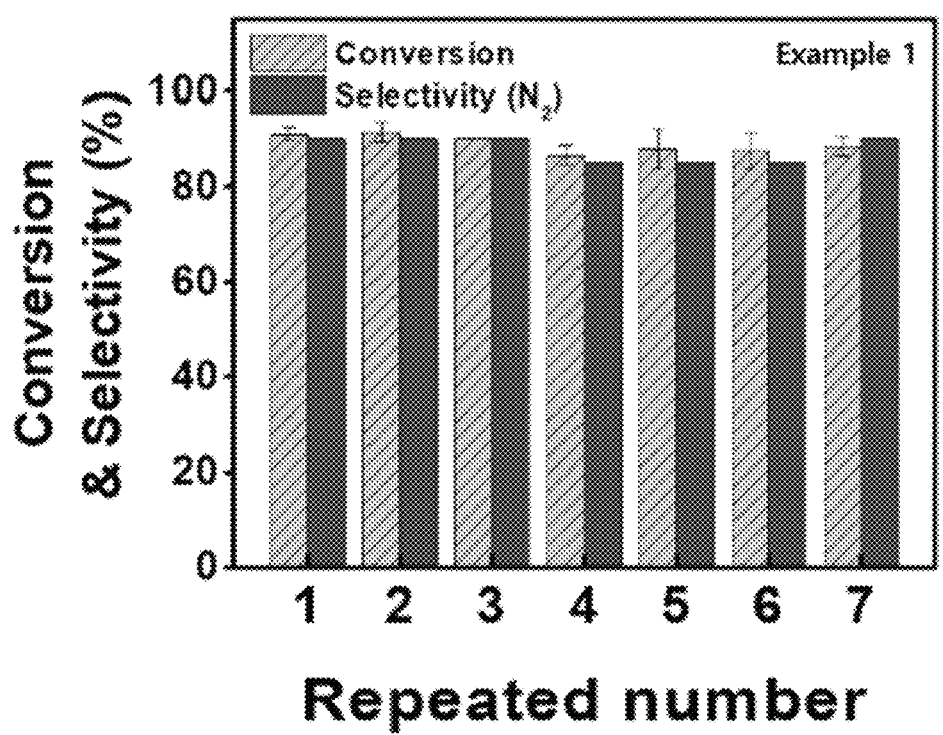
FIG. 11B is a graph showing the reduction of nitrate ions and nitrogen selectivity during repeated use of Example 1.

FIG. 11A is a graph showing the denitrification reaction efficiency depending on the wavelength of Comparative Examples 1 and 2 and Example 1, and FIG. 11B is a graph showing the reduction of nitrate ions and nitrogen selectivity during repeated use of Example 1.

Test Example 6 was performed under conditions of [catalyst]=1.5 g/L, an amount of each of rGO, Cu, and Pd of 1 wt %, pH=5.3-6.0 (not adjusted), initial Ar purging, 4 h photoreaction, and irradiation controlled by a monochromator for (11A) and irradiation with λ>320 nm for (11B).

With reference to FIG. 11A, the photocatalytic activity of Example 1 (Cu—Pd/rGO/TiO$_2$) was extended to a maximum wavelength of 450 nm, whereas almost no photocatalytic activity was observed in Comparative Example 2 (Cu—Pd/TiO$_2$). This means that the photons absorbed by Example 1 (Cu—Pd/rGO/TiO$_2$) are effectively used to induce charge transfer and multiple electron transfer by utilizing light in the visible light range.

With reference to FIG. 11B, the reduction of nitrate ions and nitrogen selectivity were maintained at levels equal to the initial activity values during 7 repeated tests of Example 1 (Cu—Pd/rGO/TiO$_2$), indicating superior stability and no inactivation.

The scope of the disclosure is defined by the claims below rather than the aforementioned detailed description, and all changes or modified forms that are capable of being derived from the meaning, range, and equivalent concepts of the appended claims should be construed as being included in the scope of the present disclosure.

What is claimed is:

1. A photocatalyst, comprising:
    titanium dioxide particles comprising titanium dioxide (TiO$_2$);
    a carbon material located on all or part of a surface of the titanium dioxide particles and comprising reduced graphene oxide (rGO); and
    bimetallic nanoparticles supported on the carbon material and comprising first metal nanoparticles and second metal nanoparticles,
    wherein the first metal nanoparticles comprise copper (Cu) and the second metal nanoparticles comprise palladium (Pd), and
    wherein both the first metal nanoparticles and the second metal nanoparticles have (111) facet.

2. The photocatalyst of claim 1, wherein the photocatalyst is a denitrification catalyst for removing a nitrate ion (NO$_3^-$).

3. The photocatalyst of claim 1, wherein a denitrification reaction is carried out without addition of an electron donor using the photocatalyst.

4. The photocatalyst of claim 3, wherein nitrogen gas (N$_2$) is produced as a final product through the denitrification reaction using the photocatalyst.

5. The photocatalyst of claim 1, wherein an average size of the first metal nanoparticles is 1 to 5 nm, and an average size of the second metal nanoparticles is 1 to 5 nm.

6. The photocatalyst of claim 1, wherein the bimetallic nanoparticles comprise the first metal nanoparticles (M1) and the second metal nanoparticles (M2) at a mass ratio (M1:M2) of 3:7 to 7:3.

7. The photocatalyst of claim 6, wherein the bimetallic nanoparticles comprise the first metal nanoparticles (M1) and the second metal nanoparticles (M2) at a mass ratio (M1:M2) of 4:6 to 6:4.

8. The photocatalyst of claim 1, comprising:
    100 parts by weight of the titanium dioxide (TiO$_2$) particles;
    0.1 to 5 parts by weight of the carbon material; and
    0.2 to 10 parts by weight of the bimetallic nanoparticles.

9. A water treatment method comprising carrying out a denitrification reaction for reducing a nitrate ion ($NO_3^-$) into nitrogen gas ($N_2$) by decomposing water using the photocatalyst of claim 1 as a catalyst under light irradiation.

10. The water treatment method of claim 9, wherein the denitrification reaction is carried out at a pH of 3 to 10.

11. The water treatment method of claim 9, wherein the light irradiation is performed using light comprising ultraviolet rays or visible light rays.

12. The water treatment method of claim 9, wherein the light irradiation is performed using light having a wavelength of 270 to 450 nm.

13. The water treatment method of claim 9, wherein the denitrification reaction is carried out without use of an external electron donor.

14. A method of preparing the photocatalyst of claim 1, comprising:
(a) preparing a first mixed solution comprising titanium dioxide ($TiO_2$) particles and a carbon material comprising reduced graphene oxide (rGO);
(b) preparing a composite comprising the titanium dioxide particles and the carbon material located on all or part of a surface of the titanium dioxide particles by stirring and drying the first mixed solution;
(c) preparing a second mixed solution comprising the composite, a first metal nanoparticle precursor and a second metal nanoparticle precursor; and
(d) preparing a photocatalyst comprising first metal nanoparticles and second metal nanoparticles supported on the carbon material of the composite by irradiating the second mixed solution with light, wherein the first metal nanoparticles comprise copper (Cu) and the second metal nanoparticles comprise palladium (Pd).

15. The method of claim 14, wherein the method further comprises (a') preparing the reduced graphene oxide by reducing graphene oxide, before step (a).

16. The method of claim 14, wherein in step (c), the first metal nanoparticle precursor comprises at least one selected from the group consisting of copper (II) chloride ($CuCl_2$), copper (II) acetate ($Cu(CH_3COO)_2$), and copper (II) nitrate ($Cu(NO_3)_2$).

17. The method of claim 14, wherein in step (c), the second metal nanoparticle precursor comprises at least one selected from the group consisting of palladium (II) chloride ($PdCl_2$), palladium (II) acetate ($Pd(CH_3COO)_2$), and palladium (II) nitrate ($Pd(NO_3)_2$).

18. The method of claim 14, wherein step (d) is performed through photodeposition.

* * * * *